(12) United States Patent
Weller et al.

(10) Patent No.: US 10,324,290 B2
(45) Date of Patent: Jun. 18, 2019

(54) SITUATIONAL AWARENESS SYSTEMS AND METHODS

(71) Applicant: New Skully, Inc., Wilmington, DE (US)

(72) Inventors: Marcus Daniel Weller, San Francisco, CA (US); Liang Guan, South San Francisco, CA (US); Andrew Wei Tam, San Anselmo, CA (US)

(73) Assignee: New Skully, Inc., Wilmington, DE (US)

( * ) Notice: Subject to any disclaimer, the term of this patent is extended or adjusted under 35 U.S.C. 154(b) by 465 days.

(21) Appl. No.: 14/973,195

(22) Filed: Dec. 17, 2015

(65) Prior Publication Data

US 2017/0176746 A1  Jun. 22, 2017

(51) Int. Cl.

| G02B 27/00 | (2006.01) |
| H04N 5/232 | (2006.01) |
| G02B 27/01 | (2006.01) |
| A42B 3/04 | (2006.01) |
| H04N 5/225 | (2006.01) |
| H04N 5/265 | (2006.01) |
| G02B 13/06 | (2006.01) |

(52) U.S. Cl.
CPC ........ *G02B 27/0172* (2013.01); *A42B 3/0426* (2013.01); *G02B 13/06* (2013.01); *H04N 5/2252* (2013.01); *H04N 5/2254* (2013.01); *H04N 5/2257* (2013.01); *H04N 5/23293* (2013.01); *H04N 5/265* (2013.01); *G02B 2027/0123* (2013.01); *G02B 2027/0138* (2013.01); *G02B 2027/0187* (2013.01)

(58) Field of Classification Search
CPC .......................... G02B 27/0172; H04N 5/2259
See application file for complete search history.

(56) References Cited

U.S. PATENT DOCUMENTS

| 5,657,073 A | 8/1997 | Henley |
| 6,819,354 B1 | 11/2004 | Foster |
| 7,948,367 B1 * | 5/2011 | Arauza ................ A42B 3/0453 340/332 |
| 8,009,229 B1 * | 8/2011 | Peterson ................ A42B 3/042 345/8 |
| 8,063,934 B2 * | 11/2011 | Donato .................. A42B 3/042 345/8 |
| 8,477,046 B2 | 7/2013 | Alonso |

(Continued)

FOREIGN PATENT DOCUMENTS

| WO | WO200130079 A1 | 4/2001 |
| WO | WO2013160255 A1 | 10/2013 |

*Primary Examiner* — Jayanti K Patel
*Assistant Examiner* — Irfan Habib
(74) *Attorney, Agent, or Firm* — Hill, Kertscher & Wharton, LLP; Gregory T. Ourada

(57) ABSTRACT

Example systems and methods are described that help increase the situational awareness of a user of a helmet, such as a motorcycle helmet. One or more cameras are physically coupled to the helmet, where each camera includes a lens and an associated image sensor. Each camera is configured to generate a video feed, which is presented to a user on a display. The video feed represents a field-of-view around the helmet, and may be projected onto a surface, such as the visor of the helmet, thereby enabling enhanced situational awareness for the user of the helmet.

3 Claims, 21 Drawing Sheets

(56) References Cited

U.S. PATENT DOCUMENTS

| | | | |
|---|---|---|---|
| 8,730,388 B2 | 5/2014 | Osborn | |
| 9,210,963 B1* | 12/2015 | Ellis | A42B 3/30 |
| 9,247,779 B1* | 2/2016 | Aloumanis | G08G 1/137 |
| 9,451,802 B2* | 9/2016 | Shearman | A42B 3/0426 |
| 9,619,712 B2* | 4/2017 | Mullins | G06K 9/00671 |
| 9,773,350 B1* | 9/2017 | Crosby | G06T 19/006 |
| 9,814,278 B2* | 11/2017 | Chung | A42B 3/0453 |
| 9,864,910 B2* | 1/2018 | Mullins | G06K 9/00671 |
| 9,955,049 B2* | 4/2018 | Pritz | H04N 5/2252 |
| 10,091,418 B2* | 10/2018 | Alvarado-Moya | G06T 3/4038 |
| 2007/0120972 A1* | 5/2007 | Kim | H04N 13/133 |
| | | | 348/51 |
| 2007/0235648 A1 | 10/2007 | Teich | |
| 2009/0002161 A1* | 1/2009 | Luciani | A42B 3/0466 |
| | | | 340/568.6 |
| 2009/0073330 A1* | 3/2009 | Viala | G06Q 10/107 |
| | | | 349/11 |
| 2009/0109292 A1* | 4/2009 | Ennis | A42B 3/042 |
| | | | 348/158 |
| 2010/0005572 A1* | 1/2010 | Chaplin | A42B 3/285 |
| | | | 2/411 |
| 2010/0095439 A1* | 4/2010 | Nolan | A42B 3/24 |
| | | | 2/421 |
| 2010/0207758 A1* | 8/2010 | Szeljack | A42B 3/0453 |
| | | | 340/475 |
| 2010/0328471 A1 | 12/2010 | Boland | |
| 2011/0083241 A1* | 4/2011 | Cole | A61F 9/06 |
| | | | 2/8.2 |
| 2011/0128349 A1 | 6/2011 | Theobald | |
| 2011/0128350 A1* | 6/2011 | Oliver | H04N 5/232 |
| | | | 348/36 |
| 2011/0231977 A1* | 9/2011 | Rupnick | A42B 3/286 |
| | | | 2/7 |
| 2013/0128046 A1* | 5/2013 | Gindin | G07C 5/0891 |
| | | | 348/148 |
| 2013/0204930 A1* | 8/2013 | Hobby | H04L 65/60 |
| | | | 709/203 |
| 2013/0215281 A1* | 8/2013 | Hobby | G06F 3/005 |
| | | | 348/207.1 |
| 2014/0075655 A1* | 3/2014 | Ratner | A42B 3/042 |
| | | | 2/422 |
| 2014/0114534 A1 | 4/2014 | Zhang et al. | |
| 2014/0125760 A1 | 5/2014 | Au | |
| 2014/0189937 A1* | 7/2014 | Pietrzak | A42B 3/042 |
| | | | 2/411 |
| 2014/0362244 A1* | 12/2014 | Martin | H04N 5/23241 |
| | | | 348/211.2 |
| 2015/0130945 A1* | 5/2015 | Yu | H04N 7/181 |
| | | | 348/158 |
| 2015/0323798 A1* | 11/2015 | Huang | G09G 5/10 |
| | | | 345/690 |
| 2016/0044276 A1* | 2/2016 | Shearman | A42B 3/0426 |
| | | | 348/207.1 |
| 2016/0110615 A1* | 4/2016 | Weller | B60R 1/00 |
| | | | 348/115 |
| 2016/0343168 A1* | 11/2016 | Mullins | G06T 19/006 |
| 2017/0177941 A1* | 6/2017 | Mullins | G06K 9/00671 |
| 2017/0184846 A1* | 6/2017 | Lu | G02B 27/017 |
| 2017/0329139 A1* | 11/2017 | Shearman | G02B 27/0172 |
| 2017/0343823 A1* | 11/2017 | Tagawa | G09G 5/00 |
| 2017/0364153 A1* | 12/2017 | Kazansky | G06F 3/015 |

* cited by examiner

SITUATIONAL AWARENESS SYSTEMS AND METHODS

TECHNICAL FIELD

The present disclosure relates to helmet-based systems that offer the user or wearer of the helmet enhanced situational awareness via one or more helmet-based video projection systems.

BACKGROUND

The primary function of a helmet, such as a motorcycle helmet, is to provide protection for a wearer's head. There may be situations where the wearer of the helmet may benefit from enhanced situational awareness. There exists a need, therefore, to enable enhanced safety features in helmets to provide, for example, enhanced situational awareness to the wearer of the helmet.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
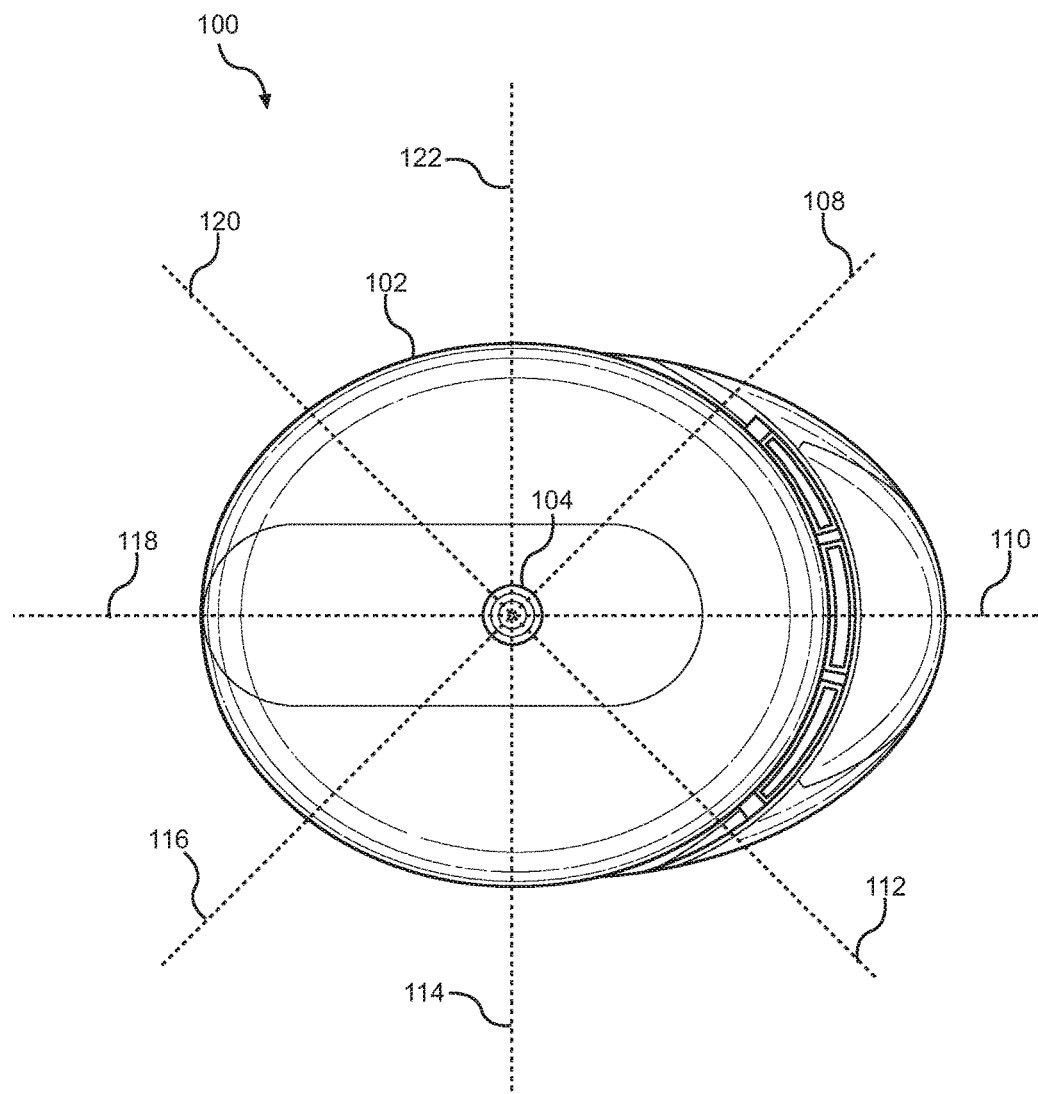
FIG. 1 is a diagram depicting a view of an embodiment of a camera system associated with a helmet, where the camera system includes a single camera that covers a 360-degree field-of-view.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit,"

"module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Presented herein are systems and methods that help improve the situational awareness of a user or wearer of a helmet, such as a motorcycle helmet. The described systems and methods include augmented reality techniques that implement a system of one or more cameras mechanically coupled to a helmet to provide a view of the region around the helmet to the user or wearer of the helmet. The video streams from the system of one or more cameras are processed and made available to the user or wearer of the helmet in real-time to provide augmented reality and enhanced situational awareness.

FIG. 1 is a diagram depicting a view of an embodiment 100 of a camera system associated with a helmet, where the camera system includes a single camera that covers a 360-degree field-of-view. In some embodiments, a fisheye lens 104 with a 360-degree field of view is mounted on the top of a helmet 102, such that the 360-degree field-of-view represents a 360-degree field-of-view around helmet 102. In some embodiments, the helmet 102 may be a motorcycle helmet. In other embodiments, the helmet 102 may be a bicycle helmet, a workers helmet, a miner's helmet, an automobile helmet and the like. A radial axis 108, a radial axis 110, a radial axis 112, a radial axis 114, a radial axis 116, a radial axis 118, a radial axis 120 and a radial axis 122, are used to denote the 360-degree field-of-view associated with fisheye lens 104. In some embodiments, the fisheye lens 104 may be optically coupled to a digital image sensor (discussed herein) that is configured to output a video feed that includes the 360-degree field-of-view around the helmet 102. The fisheye lens 104 and the digital image sensor collectively comprise the camera system that covers a 360-degree field-of-view. The video feed from the digital image sensor is processed by a processing system, and the processed video feed, or a portion of the processed video feed, is presented to the user or wearer of the helmet 102 via a suitable method, such as those discussed herein. In some embodiments, the processing system may be at least one or any combination of a digital signal processor (DSP), a microcontroller, a field-programmable gate array (FPGA) and so on. In other embodiments, the processed video feed may be projected onto the visor of the helmet 102 in the field-of-view of the user.

Figure 2:
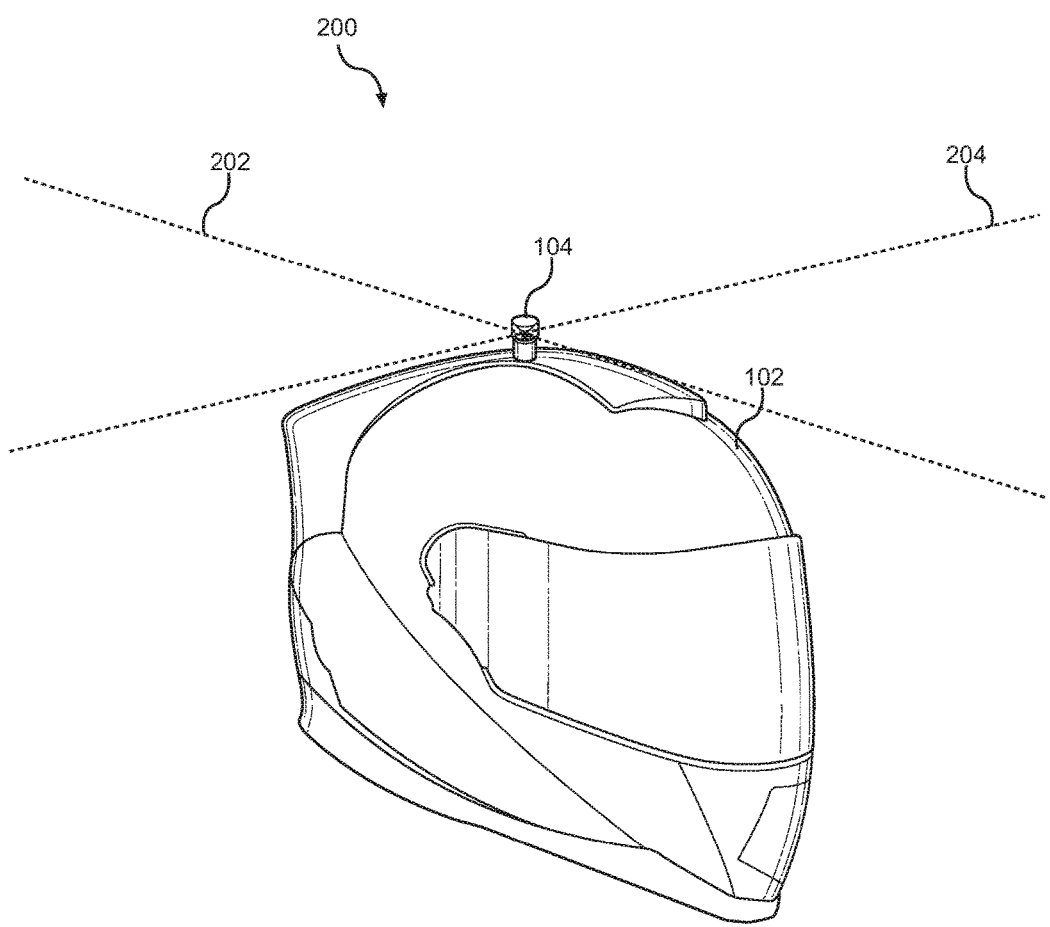
FIG. 2 is a diagram depicting an alternate view of the helmet shown in FIG. 1.

FIG. 2 is a diagram depicting an alternate view 200 of the helmet shown in FIG. 1. As discussed above, fisheye lens 104 with a 360-degree field of view may be mounted on the top of helmet 102, such that the 360-degree field-of-view represents a 360-degree field-of-view around helmet 102. An axis 202 and an axis 204 are used to denote the 360-degree field-of-view associated with fisheye lens 104. In some embodiments, axis 202 may correspond to an axis formed by substantially coaxial radial axis 110 and radial axis 118, and axis 204 may correspond to an axis formed by substantially coaxial radial axis 114 and radial axis 122.

Figure 3:
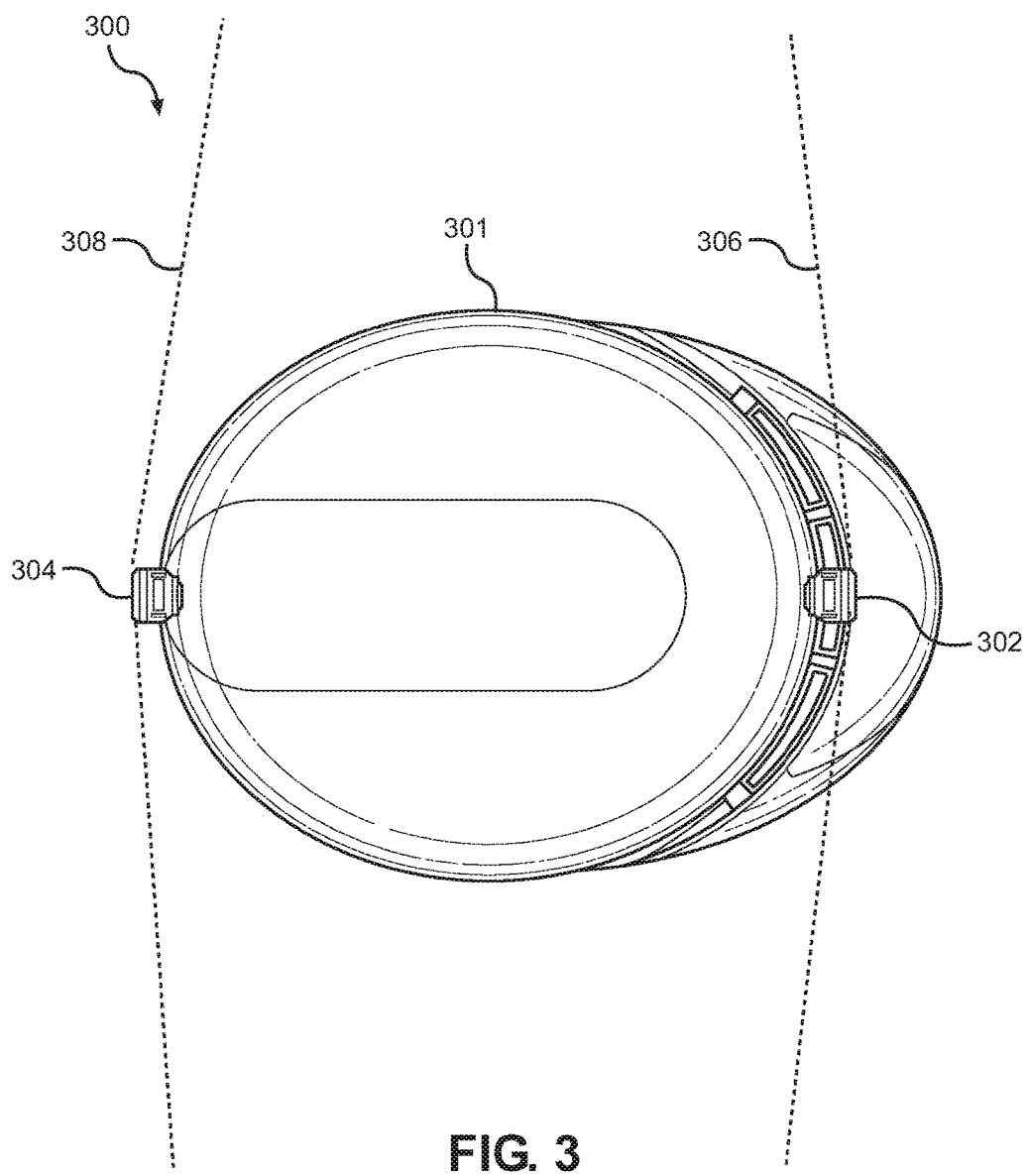
FIG. 3 is a diagram depicting a view of an embodiment of a camera system associated with a helmet, where the camera system includes two cameras, and each camera covers a 180-degree or greater field-of-view.

FIG. 3 is a diagram depicting a view of an embodiment 300 of a camera system associated with a helmet, where the camera system includes two cameras, and each camera covers a 180-degree or greater field-of-view. In some embodiments, a lens 302 with a 180-degree or greater field-of-view 306 is mounted on the front of a helmet 301, while a lens 304 with a 180-degree or greater field-of-view 308 is mounted on the rear of helmet 301, such that a combination of the fields-of-view of lens 302 and lens 304 constitutes a 360-degree field-of-view around helmet 301. In some embodiments, the helmet 301 may be a motorcycle helmet. In other embodiments, the helmet 301 may be a bicycle helmet, a workers helmet, a miner's helmet, an automobile helmet and the like. In some embodiments, the lens 302 and lens 304 may be optically coupled to two distinct digital image sensors (discussed herein), where each digital image sensor is configured to output a video feed. The combination of lens 302 and the associated digital image sensor, and the combination of lens 304 and the associated digital image sensor together constitute a two-camera system configured to provide a 360-degree field-of-view around helmet 301, where each of the cameras in the two-camera system provides a 180-degree or greater field-of-view. The video feeds from the two digital image sensors are processed by a processing system, combined to give a single video feed with a 360-degree field-of-view, and this single video feed with a 360-degree field-of-view, or a portion of the single video feed with a 360-degree field-of-view, is presented to the user or wearer of the helmet via a suitable method. In some embodiments, the processing system may be at least one or any combination of a digital signal processor (DSP), a microcontroller, a field-programmable gate array (FPGA) and so on. In other embodiments, the single video feed with a 360-degree field-of-view, or a portion of the single video feed with a 360-degree field-of-view, may be projected onto the visor of the helmet 301 in the field-of-view of the user.

Figure 4:
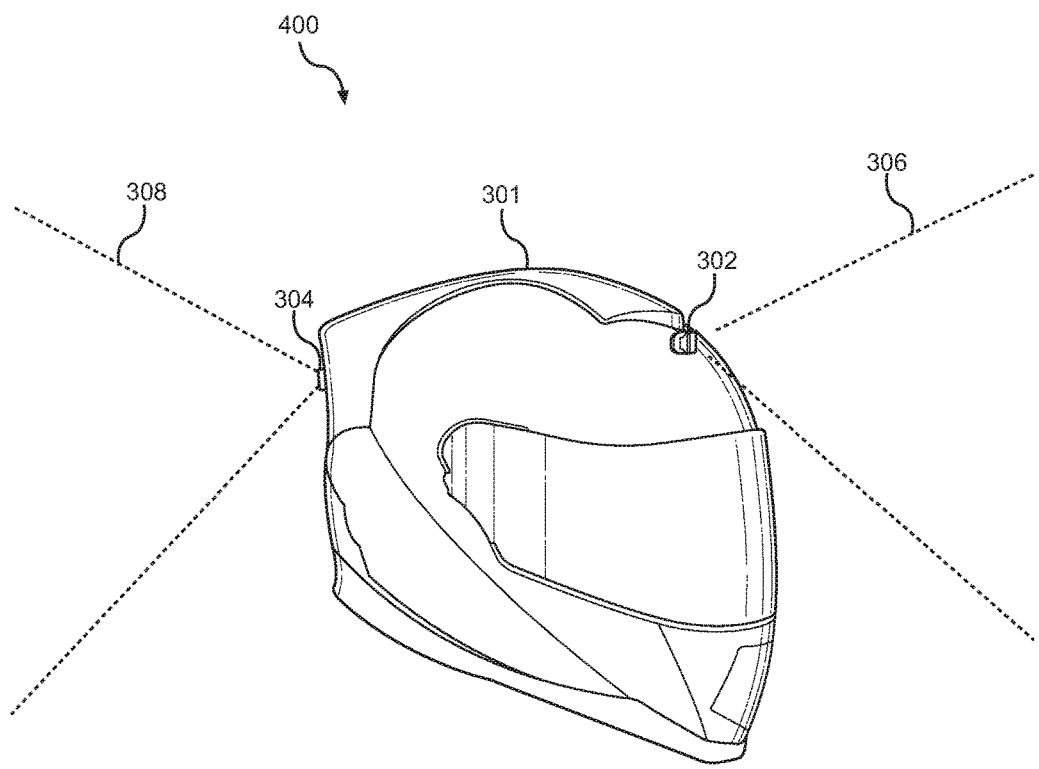
FIG. 4 is a diagram depicting an alternate view of the helmet shown in FIG. 3.

FIG. 4 is a diagram depicting an alternate view 400 of the helmet shown in FIG. 3. In some embodiments, lens 302 with a 180-degree or greater field-of-view 306 is mounted on the front of helmet 301, while lens 304 with a 180-degree or greater field-of-view 308 is mounted on the rear of helmet 301, such that a combination of the fields-of-view of lens 302 and lens 304 constitutes a 360-degree field-of-view around helmet 301.

Figure 5:
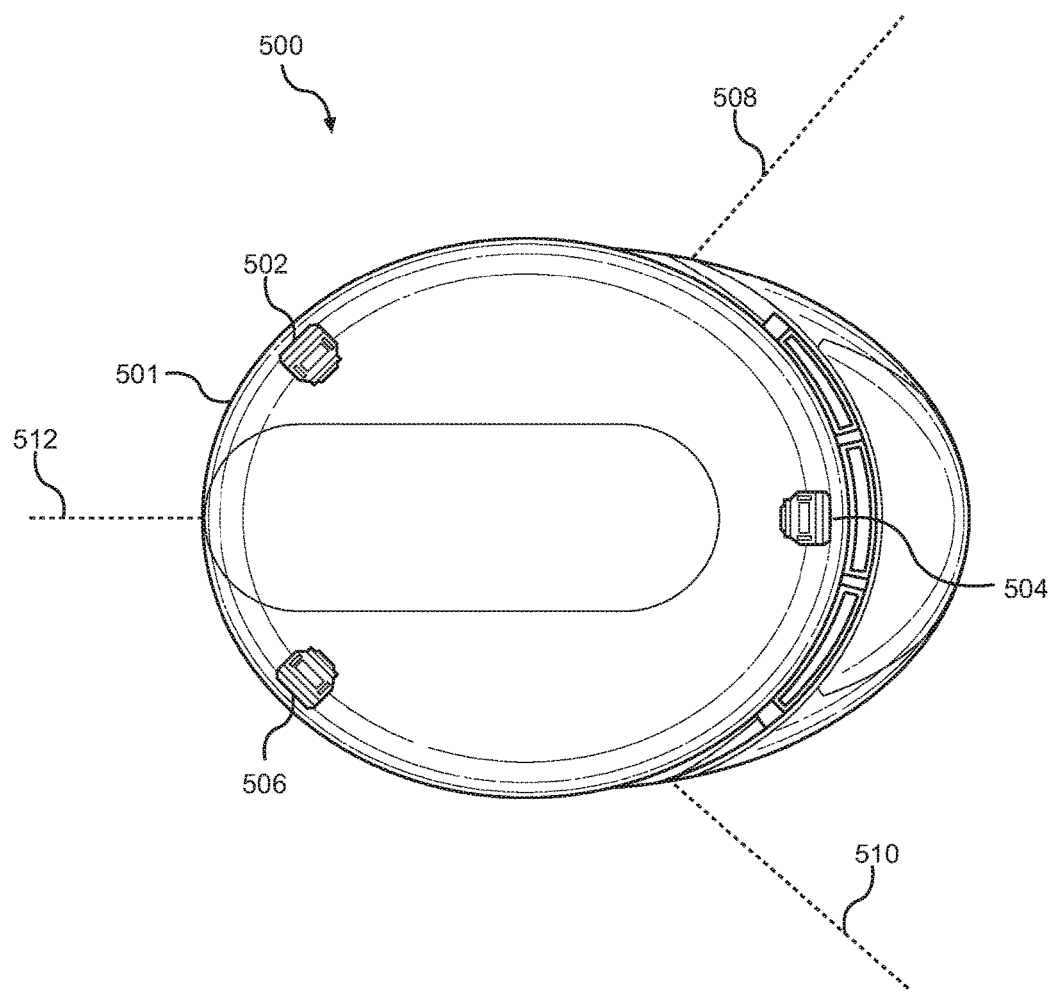
FIG. 5 is a diagram depicting a view of an embodiment of a camera system associated with a helmet, where the camera system includes three cameras such that each camera covers a 120-degree or greater field-of-view.

FIG. 5 is a diagram depicting a view of an embodiment 500 of a camera system associated with a helmet, where the camera system includes three cameras, and each camera covers a 120-degree or greater field-of-view. In some embodiments, a lens 502 with a 120-degree or greater field-of-view, a lens 504 with a 120-degree or greater field-of-view, and a lens 506 with a 120-degree or greater field-of-view are mounted on a helmet 501, such that a combination of the fields-of-view of lens 502, lens 504 and lens 506 constitutes a 360-degree field-of-view around helmet 501. An axis 508, an axis 510 and an axis 512 are used to denote the approximate boundaries of the 120-degree or greater fields-of-view of lens 502, lens 504 and lens 506.

In some embodiments, the helmet 501 may be a motorcycle helmet. In other embodiments, the helmet 501 may be a bicycle helmet, a workers helmet, a miner's helmet, an automobile helmet and the like. In some embodiments, the lens 502, lens 504 and lens 506 may be optically coupled to three distinct digital image sensors (discussed herein), wherein each digital image sensor is configured to output a video feed. The combination of lens 502 and the associated digital image sensor, the combination of lens 504 and the associated digital image sensor, and the combination of lens 506 and the associated digital image sensor together constitute a three-camera system configured to provide a 360-degree field-of-view around helmet 501, where each of the cameras in the three-camera system provides a 120-degree or greater field-of-view. The video feeds from the three digital image sensors are processed by a processing system, combined to give a single video feed with a 360-degree field-of-view, and this single video feed with a 360-degree field-of-view, or a portion of the single video feed with a 360-degree field-of-view, is presented to the user or wearer of the helmet via a suitable method. In some embodiments, the processing system may be at least one or any combination of a digital signal processor (DSP), a microcontroller, a field-programmable gate array (FPGA) and so on. In other embodiments, the single video feed with a 360-degree field-of-view, or a portion of the single video feed with a 360-degree field-of-view, may be projected onto the visor of the helmet 501 in the field-of-view of the user.

Figure 6A:
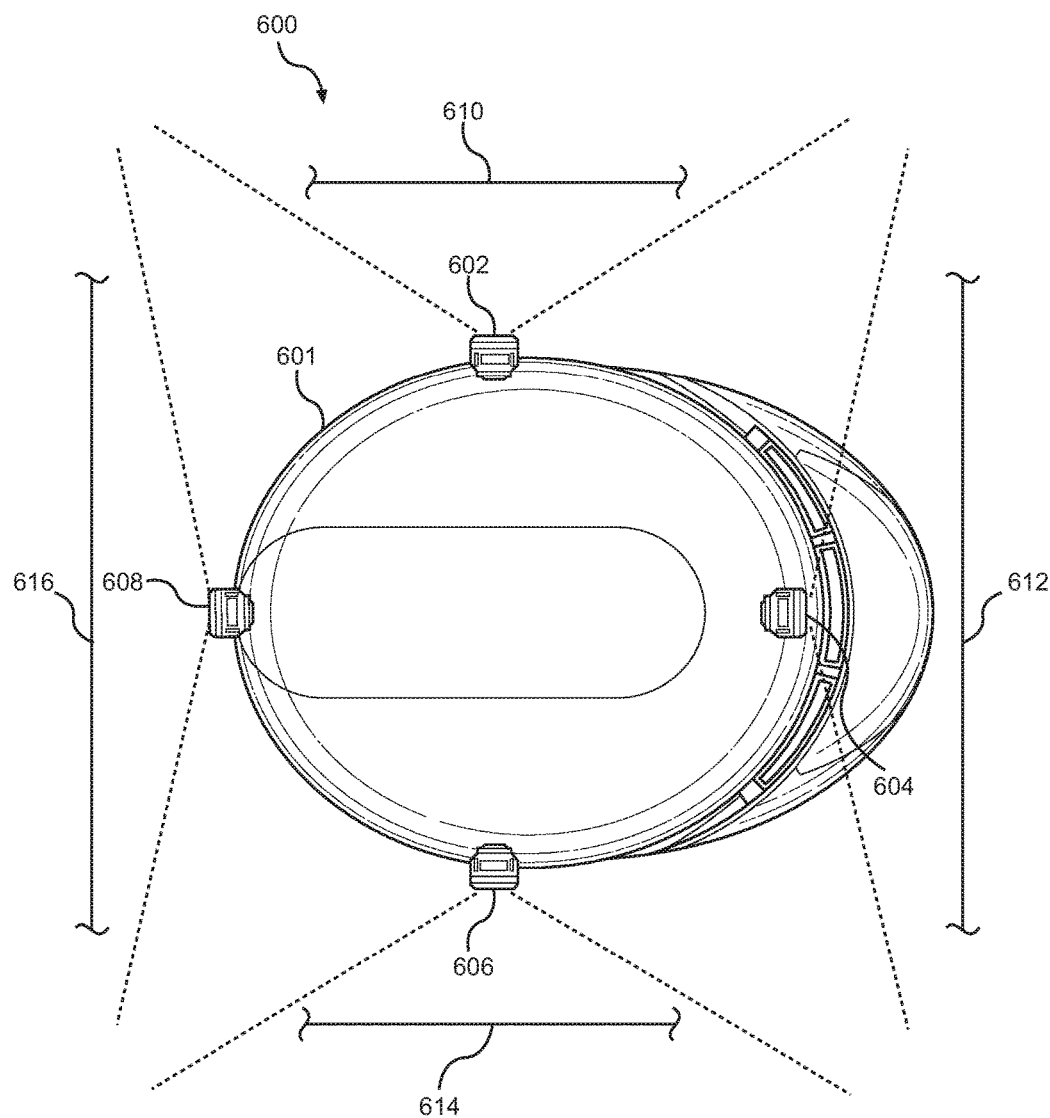
FIG. 6A is a block diagram depicting a view of an embodiment of a camera system associated with a helmet, where the camera system includes four cameras such that each camera covers a 90-degree or greater field-of-view.

FIG. 6A is a block diagram depicting a view of an embodiment 600 of a camera system associated with a helmet, where the camera system includes four cameras, and each camera covers a 90-degree or greater field-of-view. In some embodiments, a lens 602 with a 90-degree or greater field-of-view 610, a lens 604 with a 90-degree or greater field-of-view 612, a lens 606 with a 90-degree or greater field-of-view 614 and a lens 608 with a 90-degree or greater field-of-view 616 are mounted on a helmet 601, such that a combination of the fields-of-view of lens 602, lens 604, lens 606 and lens 608 constitutes a 360-degree field-of-view around helmet 601.

In some embodiments, the helmet 601 may be a motorcycle helmet. In other embodiments, the helmet 601 may be a bicycle helmet, a workers helmet, a miner's helmet, an automobile helmet and the like. In some embodiments, the lens 602, lens 604, lens 606 and lens 608 may be optically coupled to four distinct digital image sensors (discussed herein), wherein each digital image sensor is configured to output a video feed. The combination of lens 602 and the associated digital image sensor, the combination of lens 604 and the associated digital image sensor, the combination of lens 606 and the associated digital image sensor, and the combination of lens 608 and the associated digital image sensor together constitute a four-camera system configured to provide a 360-degree field-of-view around helmet 601, where each of the cameras in the four-camera system provides a 90-degree or greater field-of-view. The video feeds from the four digital image sensors are processed by a processing system, combined to give a single video feed with a 360-degree field-of-view, and this single video feed with a 360-degree field-of-view, or a portion of the single video feed with a 360-degree field-of-view, is presented to the user or wearer of the helmet via a suitable method. In some embodiments, the processing system may be at least one or any combination of a digital signal processor (DSP), a microcontroller, a field-programmable gate array (FPGA) and so on. In other embodiments, the single video feed with a 360-degree field-of-view, or a portion of the single video feed with a 360-degree field-of-view, may be projected onto the visor of the helmet 601 in the field-of-view of the user.

Figure 6B:
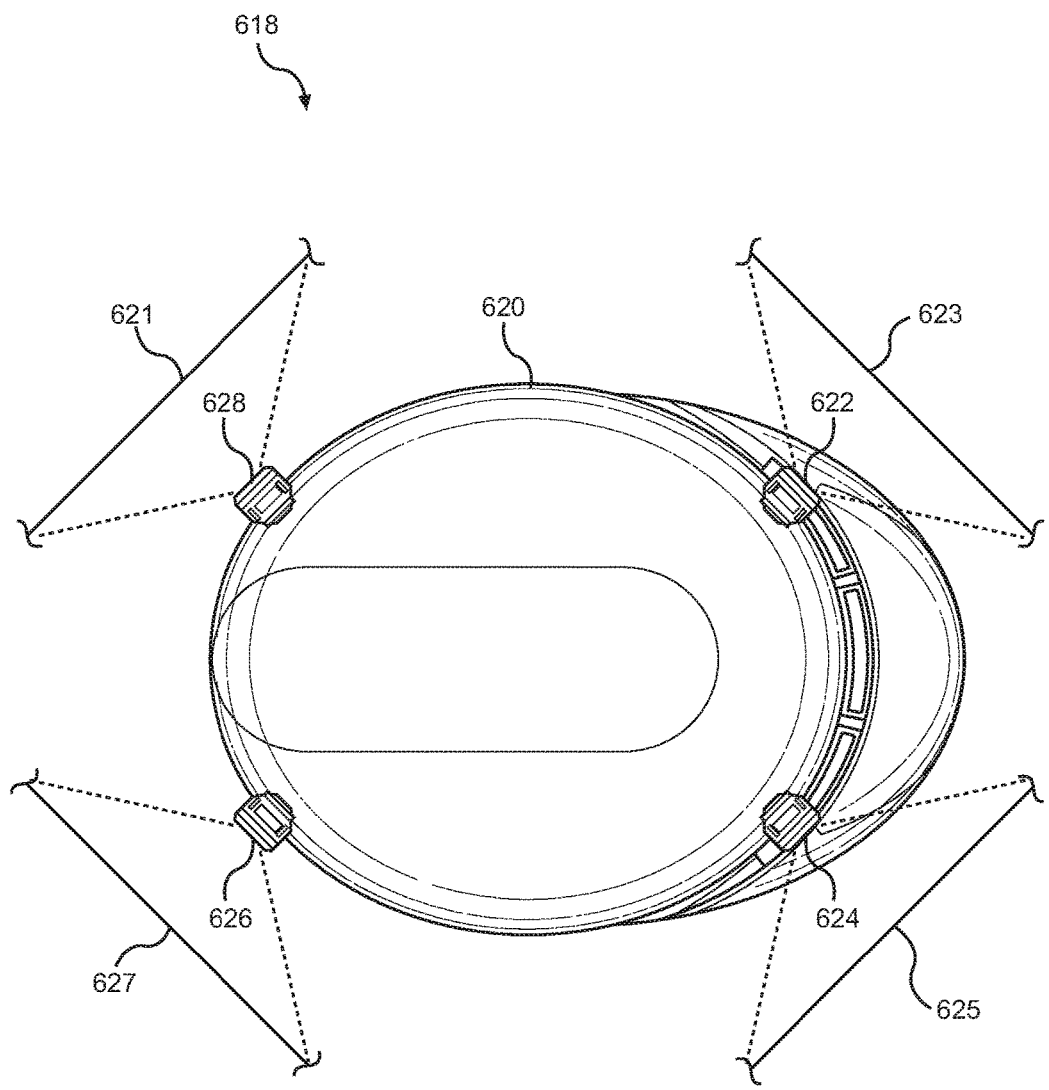
FIG. 6B is a block diagram depicting a view of an embodiment of a camera system associated with a helmet, where the camera system includes four cameras such that each camera covers a 90-degree or greater field-of-view.

FIG. 6B is a block diagram depicting a view of an embodiment 618 of a camera system associated with a helmet, where the camera system includes four cameras such that each camera covers a 90-degree or greater field-of-view. In some embodiments, a lens 622 with a 90-degree or greater field-of-view 623, a lens 624 with a 90-degree or greater field-of-view 625, a lens 626 with a 90-degree or greater field-of-view 627 and a lens 628 with a 90-degree or greater field-of-view 621 are mounted on a helmet 620, such that a combination of the fields-of-view of lens 622, lens 624, lens 626 and lens 628 constitutes a 360-degree field-of-view around helmet 620. In some embodiments, lens 626 and lens 628 are physically oriented on the helmet 620 such that the optical axes of lens 626 and lens 628 are substantially oriented in the directions of the right and left blind spots of the rider respectively. Since the resolution capability of a lens is substantially maximum in the proximity of the optical axis of the lens (in the center field of the lens), orienting lens 626 and lens 628 such that the optical axes of lens 626 and lens 628 are substantially oriented in the directions of the right and left blind spots of the rider, respectively, ensures that the blind spots of the rider are covered with maximum resolution by the center fields of lens 626 and lens 628 respectively, thereby improving the situational awareness of the rider in the region of the rider's blind spots. In other embodiments, lens 622 and lens 624 are physically oriented on the helmet 620 such that the optical axes of lens 622 and lens 624 are substantially oriented in the directions of the left and right front corners of the rider respectively. Since the resolution capability of a lens is substantially maximum in the proximity of the optical axis of the lens (in the center field of the lens), orienting lens 622 and lens 624 such that the optical axes of lens 622 and lens 624 are substantially oriented in the directions of the left and right front corners of the rider respectively ensures that the front corners of the rider are covered with maximum resolution by the center fields of lens 622 and lens 624 respectively, thereby improving the situational awareness of the rider in the region of the rider's peripheral vision.

In some embodiments, the helmet 620 may be a motorcycle helmet. In other embodiments, the helmet 620 may be a bicycle helmet, a workers helmet, a miner's helmet, an automobile helmet and the like. In some embodiments, the lens 622, lens 624, lens 626 and lens 628 may be optically coupled to four distinct digital image sensors (discussed herein), wherein each digital image sensor is configured to output a video feed. The combination of lens 622 and the associated digital image sensor, the combination of lens 624 and the associated digital image sensor, the combination of lens 626 and the associated digital image sensor, and the combination of lens 628 and the associated digital image sensor together constitute a four-camera system configured to provide a 360-degree field-of-view around helmet 620, where each of the cameras in the four-camera system provides a 90-degree or greater field-of-view. The video feeds from the four digital image sensors are processed by a processing system, combined to give a single video feed with a 360-degree field-of-view, and this single video feed with a 360-degree field-of-view, or a portion of the single video feed with a 360-degree field-of-view, is presented to the user or wearer of the helmet via a suitable method. In some embodiments, the processing system may be at least one or any combination of a digital signal processor (DSP), a microcontroller, a field-programmable gate array (FPGA) and so on. In other embodiments, the single video feed with a 360-degree field-of-view, or a portion of the single video feed with a 360-degree field-of-view, may be projected onto the visor of the helmet 620 in the field-of-view of the user.

Figure 6C:
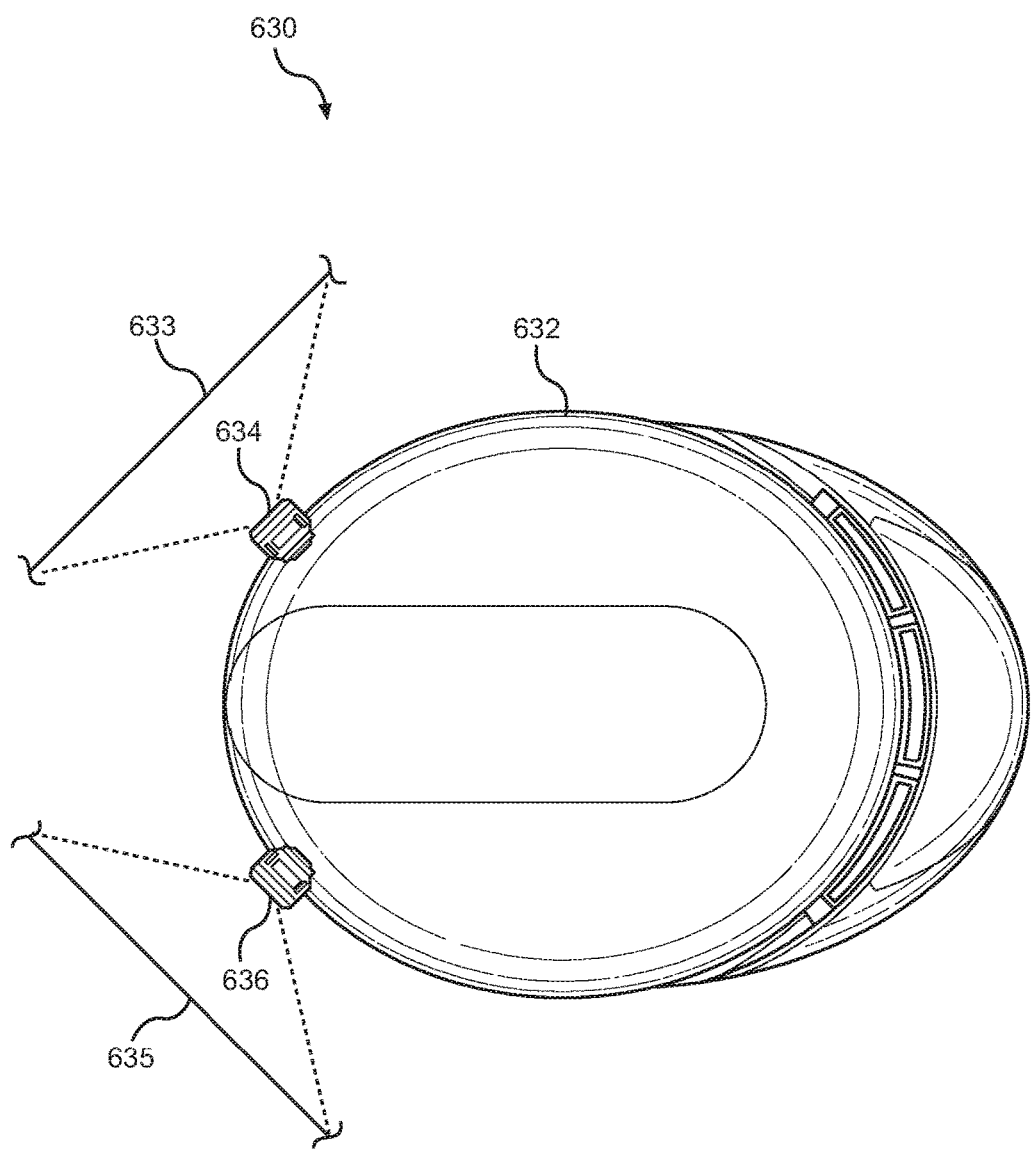
FIG. 6C is a block diagram depicting a view of an embodiment of a camera system associated with a helmet, where the camera system includes two cameras such that each camera covers a 90-degree or greater field-of-view.

FIG. 6C is a block diagram depicting a view of an embodiment 630 of a camera system associated with a helmet, where the camera system includes two cameras such that each camera covers a 90-degree or greater field-of-view. In some embodiments, a lens 634 with a 90-degree or greater field-of-view 633 and a lens 636 with a 90-degree or greater field-of-view 635 are mounted on a helmet 632, such that a combination of the fields-of-view of lens 634 and lens 636 constitutes a 180-degree or greater field-of-view to the rear of the helmet 632. In some embodiments, the combination of the fields-of-view of lens 634 and lens 636 may be approximately a 220-degree field-of-view to the rear of the helmet 632. In some embodiments, lens 634 and lens 636 are physically oriented on the helmet 632 such that the optical axes of lens 634 and lens 636 are substantially oriented in the directions of the left and right blind spots of the rider respectively. Since the resolution capability of a lens is substantially maximum in the proximity of the optical axis of the lens (in the center field of the lens), orienting lens 634 and lens 636 such that the optical axes of lens 634 and lens 636 are substantially oriented in the direction of the left and right blind spots of the rider respectively ensures that the left and right blind spots of the rider are covered with maximum resolution by the center fields of lens 634 and lens 636 respectively, thereby improving the situational awareness of the rider in the region of the rider's blind spots.

In some embodiments, the helmet 632 may be a motorcycle helmet. In other embodiments, the helmet 632 may be a bicycle helmet, a workers helmet, a miner's helmet, an automobile helmet and the like. In some embodiments, the lens 634, and lens 636 may be optically coupled to two distinct digital image sensors (discussed herein), wherein each digital image sensor is configured to output a video feed. The combination of lens 634 and the associated digital image sensor, and the combination of lens 636 and the associated digital image sensor together constitute a two-camera system configured to provide a 180-degree or greater field-of-view to the rear of helmet 632, where each of the cameras in the two-camera system provides a 90-degree or greater field-of-view. The video feeds from the two digital image sensors are processed by a processing system, combined to give a single video feed with a 180-degree or greater field-of-view, and this single video feed with a 180-degree or greater field-of-view, or a portion of the single video feed with a 180-degree or greater field-of-view, is presented to the user or wearer of the helmet via a suitable method. In some embodiments, the processing system may be at least one or any combination of a digital signal processor (DSP), a microcontroller, a field-programmable gate array (FPGA) and so on. In other embodiments, the single video feed with a 180-degree or greater field-of-view, or a portion of the single video feed with a 180-degree or greater field-of-view, may be projected onto the visor of the helmet 632 in the field-of-view of the user.

Figure 7A:
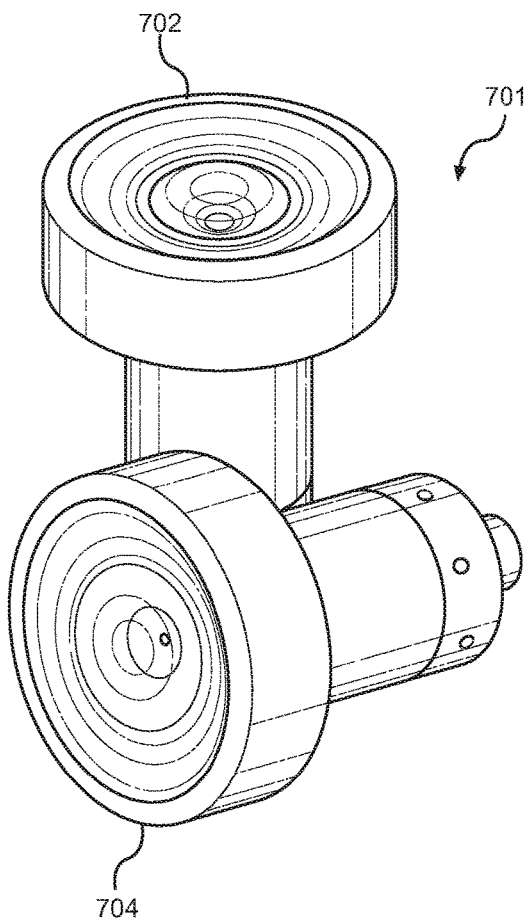
FIGS. 7A and 7B are diagrams that represent different embodiments of optical lenses that may be used in some embodiments of the systems described herein.

FIG. 7A is a diagram that represents an embodiment 701 of a fisheye lens that may be used in some embodiments of the systems described herein. Fisheye lens 702 and fisheye lens 704 are examples of fisheye lenses, wherein fisheye lens 702 and fisheye lens 704 each has a 180-degree field-of view.

Figure 7B:
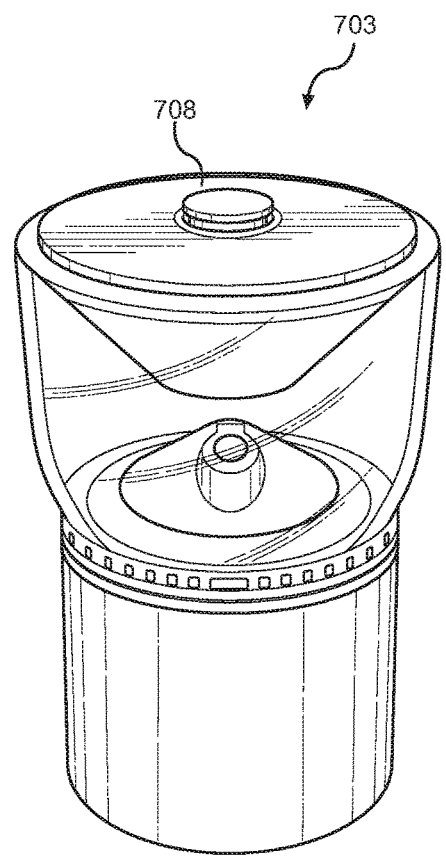

FIG. 7B is a diagram that represents an embodiment 703 of a fisheye lens that may be used in some embodiments of the systems described herein. Fisheye lens 708 is an example of a fisheye lens with a 360-degree field-of-view. In some embodiments, fisheye lens 708 is based on a hybrid lens design that includes both reflective and refractive optical elements.

Figure 8A:
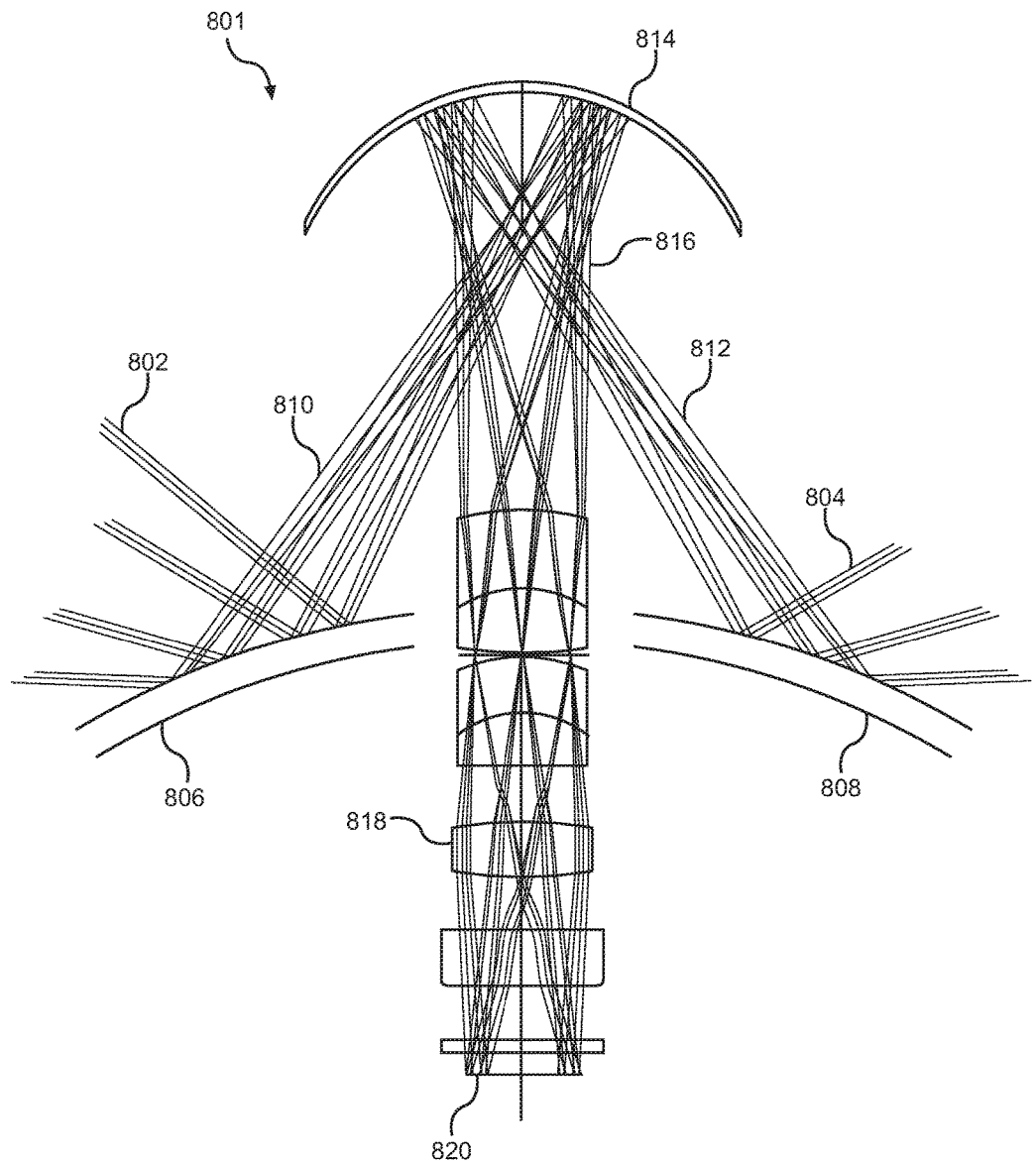
FIG. 8A is an optical diagram depicting an embodiment of an optical lens that substantially covers a 360-degree field-of-view.

FIG. 8A is an optical diagram depicting an embodiment of an optical lens 801 that substantially covers a 360-degree field-of-view. In some embodiments, optical lens 801 includes a reflective mirror with sections shown as section 806 and section 808. Light rays 802 and light rays 804 are incident on section 806 and section 808 respectively. Light rays 810 and light rays 812 are reflections of light rays 802 and light rays 804 respectively from section 806 and section 808 respectively. Light rays 810 and light rays 812 are incident on reflective mirror 814, and are collectively reflected as light rays 816. Light rays 816 pass through optical lens assembly 818, which focuses light rays 816 onto digital image sensor 820. In some embodiments, the construction of optical lens 801 is based on a hybrid design that includes both reflective and refractive optical elements, and offers a 360-degree field-of-view.

Figure 8B:
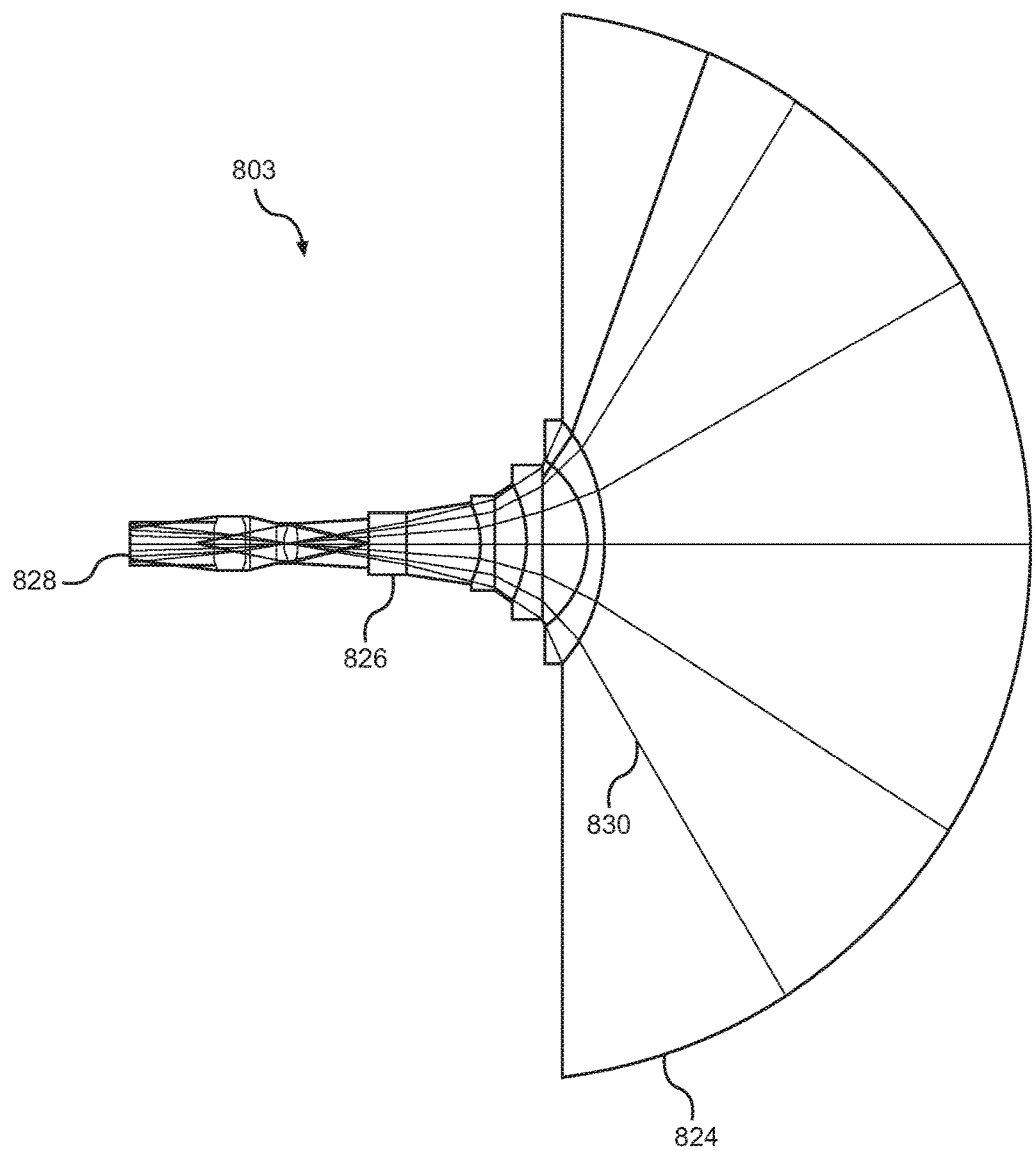
FIG. 8B is an optical diagram depicting an embodiment of an optical lens that substantially covers a 180-degree field-of-view.

FIG. 8B is an optical diagram depicting an embodiment of an optical lens 803 that substantially covers a 180-degree field-of-view. In some embodiments, light rays such as light ray 830 from a 180-degree field-of-view 824 is focused onto a digital image sensor 828 by optical lens assembly 826. This embodiment of the optical lens 803 includes refractive elements.

Figure 8C:
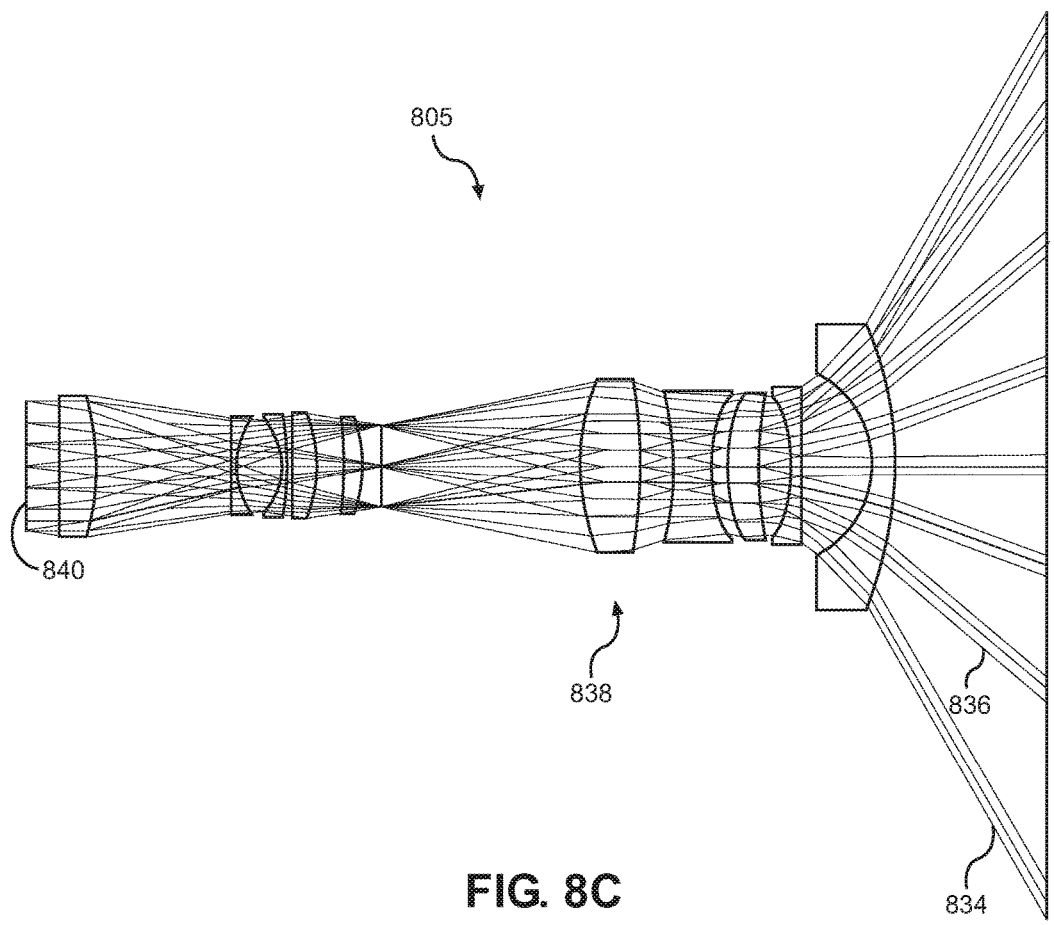
FIG. 8C is an optical diagram depicting an embodiment of an optical lens that substantially covers a 120-degree field-of-view.

FIG. 8C is an optical diagram depicting an embodiment of an optical lens 805 that substantially covers a 120-degree field-of-view. In some embodiments, light rays such as light ray 836 from a 120-degree field-of-view 834 is focused onto a digital image sensor 840 by optical lens assembly 838. This embodiment of the optical lens 805 includes refractive elements.

Figure 8D:
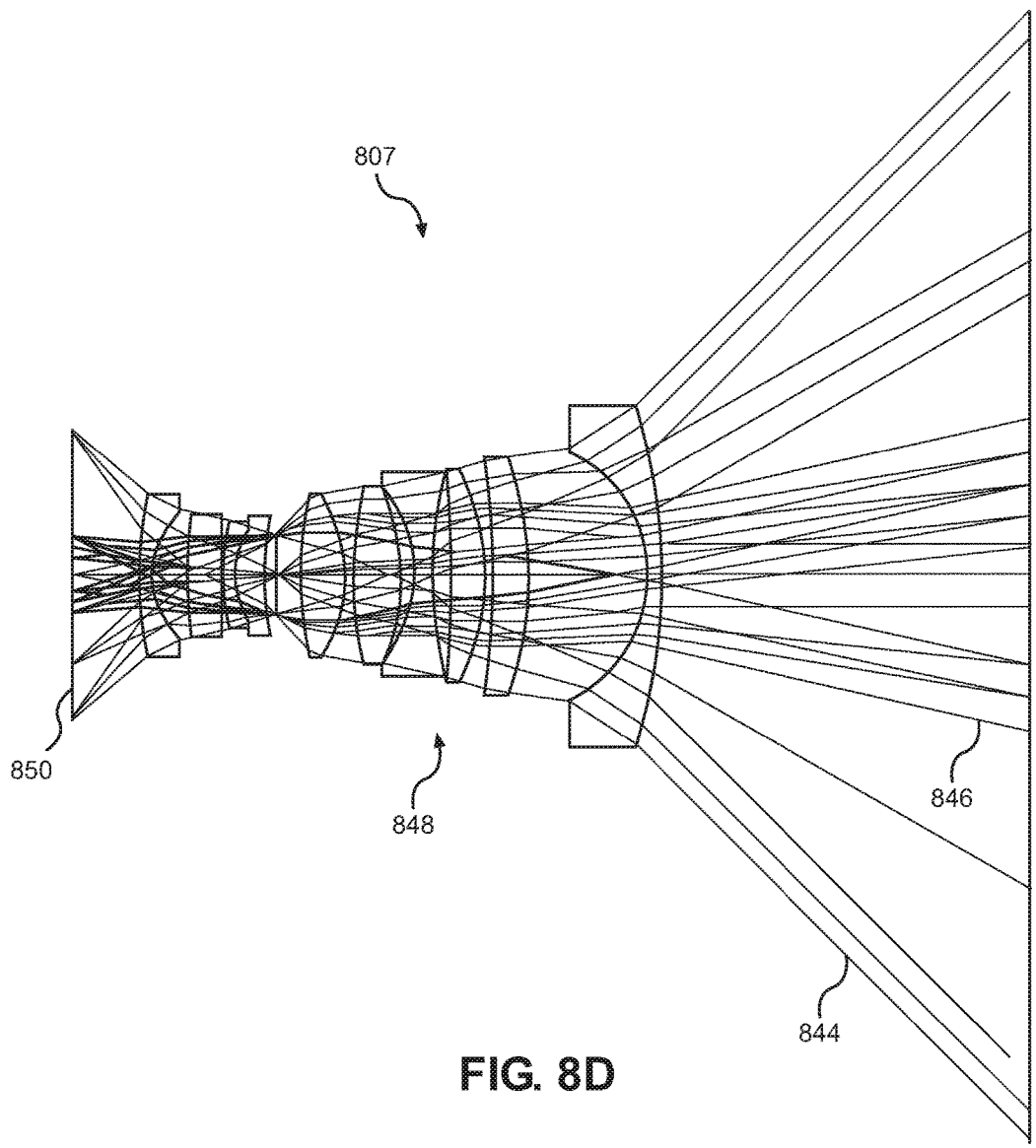
FIG. 8D is an optical diagram depicting an embodiment of an optical lens that substantially covers a 90-degree field-of-view.

FIG. 8D is an optical diagram depicting an embodiment of an optical lens 807 that substantially covers a 90-degree field-of-view. In some embodiments, light rays such as light ray 846 from a 120-degree field-of-view 844 is focused onto a digital image sensor 850 by optical lens assembly 848. This embodiment of the optical lens 807 includes refractive elements.

Figure 9:
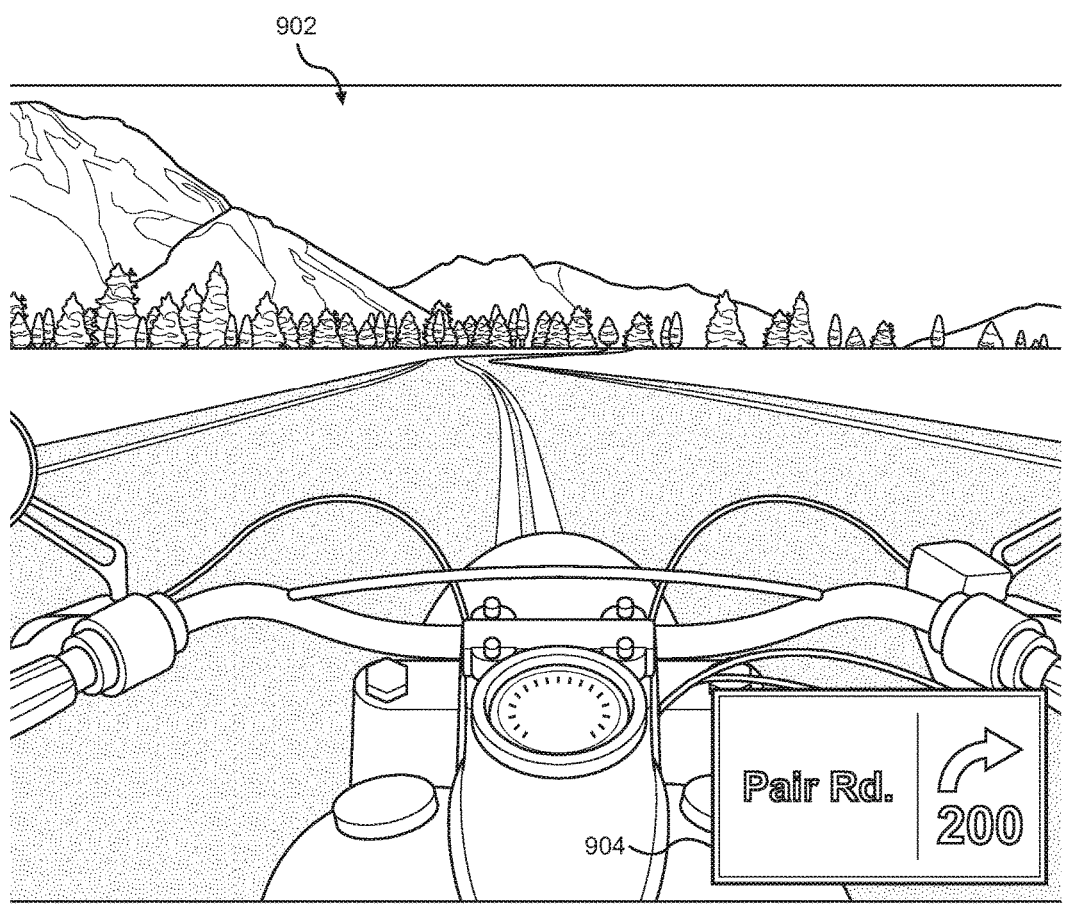
FIG. 9 represents a diagram depicting a view available to the user or wearer of a motorcycle helmet in accordance with an embodiment of the invention.

FIG. 9 represents a diagram depicting a view 902 available to the user or wearer of a motorcycle helmet in accordance with an embodiment of the invention. In some embodiments, view 902 is a view through the visor of helmet 102 (or any other helmet discussed herein). In other embodiments, a navigation system is integrated with the helmet 102, and navigation information from the navigation system, including turn-by-turn directions 904, can be projected onto, for example, the visor of helmet 102. This enhances the situational awareness of the user while providing the additional convenience of providing at-a-glance turn-by-turn directions to the wearer or user of the helmet 102.

Figure 10:
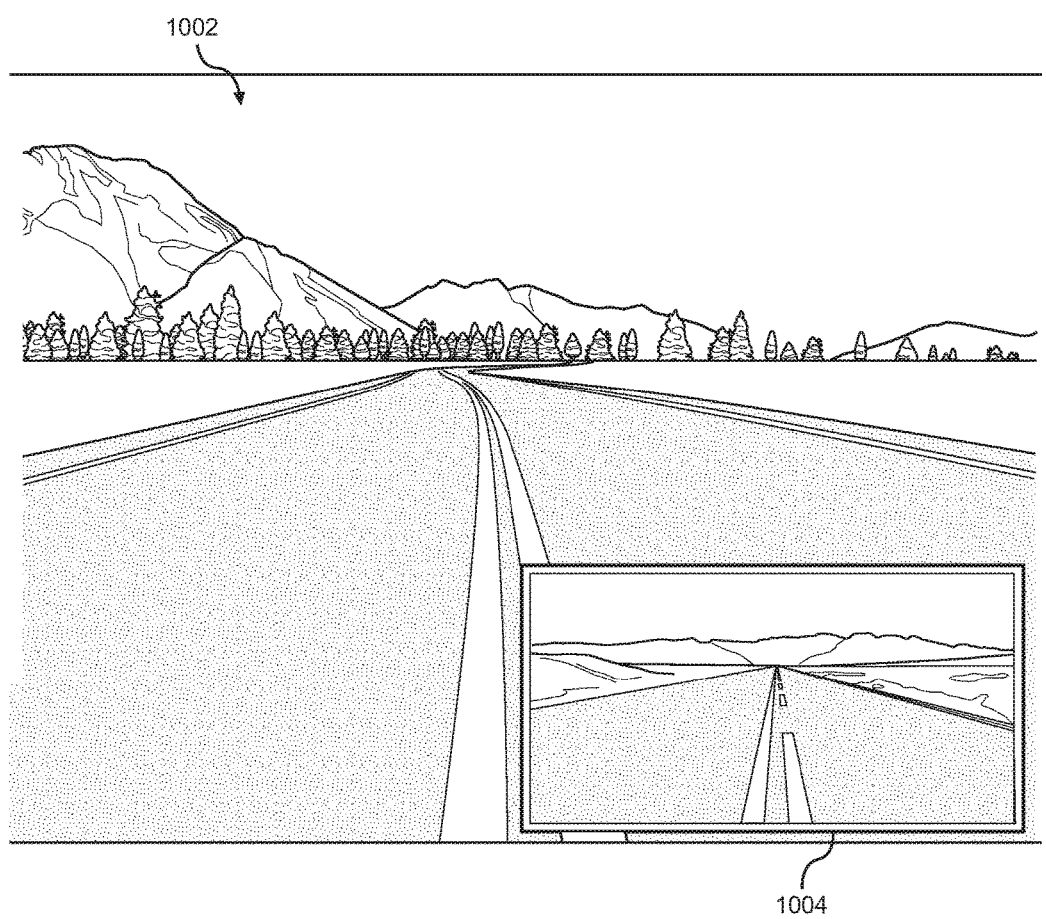
FIG. 10 represents a diagram depicting another view available to the user or wearer of a motorcycle helmet in accordance with an embodiment of the invention.

FIG. 10 represents a diagram depicting another view 1002 available to the user or wearer of a motorcycle helmet in accordance with an embodiment of the invention. In some embodiments, view 1002 is a view through the visor of helmet 102 (or any other helmet discussed herein). In some embodiments, the view 1002 through the visor of helmet 102 may be augmented by a projected video display 1004, where the projected video display 1004 may include a video stream or a portion of a video stream from any of the camera systems described herein. In some embodiments, the projected video display 1004 may be configured to display a video stream that shows a rear view to the wearer of the helmet, thereby functioning as an electronic rear-view mirror for a motorcycle rider. In some embodiments, the video stream displayed on the projected video display 1004 may be a complete 360-degree field-of-view around the helmet. In other embodiments, the projected video display 1004 may be a portion of the complete 360-degree field-of-view around the helmet.

In some embodiments, the portion of the video stream displayed on the projected video display 1004 is fixed. In other embodiments, the portion of the video stream displayed on the projected video display 1004 is user-selectable. For example, a user or wearer of helmet 102 may use tap commands, voice commands or any other input commands that the helmet 102 is configured to accept to select, for example, a side view or a rear view of the area around the user. In some embodiments, the helmet 102 may include an accelerometer and/or a gyroscope that are configured to detect and measure head movements of the user or wearer of the helmet 102. In these embodiments, the video stream displayed on the projected video display 1004 may be slaved to the head movement of the user or wearer of the helmet. For example, the portion of the video stream displayed on the video display 1004 may be configured to pan in a horizontal direction (in azimuth) based on the motion of the head of the user or wearer of the helmet 102. Alternatively, the portion video stream displayed on the video display 1004 may be fixed and independent of the motion of the head of the user or wearer of the helmet. Some embodiments may also include navigation data or other data such as caller ID included with the projected video display 1004.

Figure 11:
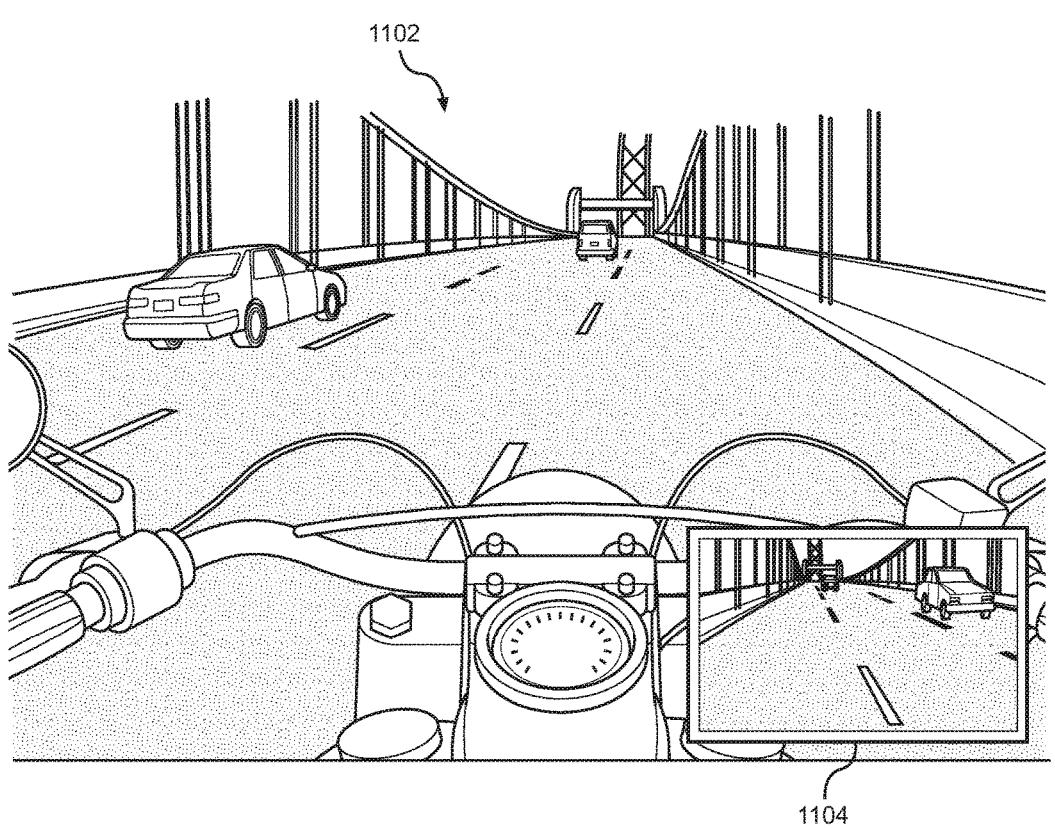
FIG. 11 represents a diagram depicting another view available to the user or wearer of a motorcycle helmet in accordance with an embodiment of the invention.

FIG. 11 represents a diagram depicting another view available to the user or wearer of a motorcycle helmet in accordance with an embodiment of the invention. In some embodiments, view 1102 is a view through the visor of helmet 102 (or any other helmet discussed herein). In some embodiments, the view 1102 through the visor of helmet 102 may be augmented by a projected video display 1104, wherein the projected video display 1104 may include a video stream or a portion of a video stream from any of the camera systems described earlier in this specification. In some embodiments, the projected video display 1104 may be configured to display a video stream that shows a rear view to the wearer of the helmet, thereby functioning as an electronic rear-view mirror for a motorcycle rider. For example, as shown in FIG. 11, the projected video display 1104 is configured to display a video stream that shows a rear view to the wearer of the helmet, in this case a motorcycle rider. The rear view also includes a view of the traffic behind the motorcycle rider, wherein the traffic may include both vehicular and pedestrian traffic.

In some embodiments, methods of displaying the video stream onto projected video display 1104 may include the methods discussed in the description of FIG. 10, including, but not limited to, projecting a portion of the 360-degree field-of-view or the entire 360-degree field-of-view, user-selectivity associated with the video stream displayed onto projected video display 1104, and the like.

Figure 12:
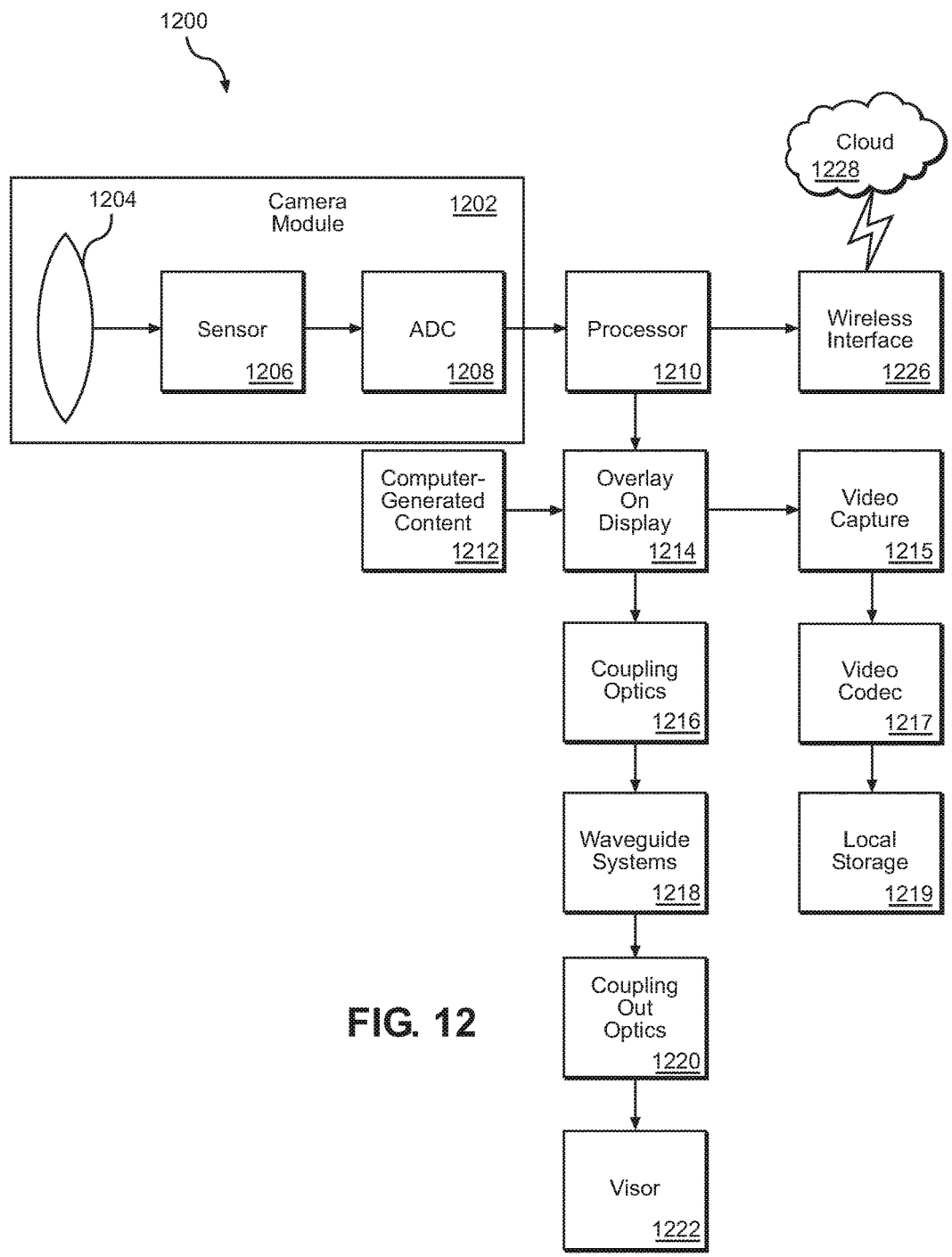
FIG. 12 is a block diagram depicting an embodiment of a system configured to project a video stream captured by a single camera module onto the visor of a helmet.

FIG. 12 is a block diagram depicting an embodiment of a system 1200 configured to project a video stream captured by a single camera module onto the visor of a helmet. In some embodiments, system 1200 includes a camera module 1202. Camera module 1202 further includes a lens 1204, a sensor 1206 which can be a digital image sensor, and an analog-to-digital converter (ADC) 1208. The lens 1204 gathers and focuses light onto sensor 1206. The sensor 1206 produces an analog signal in response to the light incident on the sensor 1206. The analog signal output by the sensor 1206 is input to an ADC 1208, which digitizes the analog signal. In some embodiments, the digitized signal out of the ADC 1208 may be a video stream. The digitized signal out of the ADC 1208 is input to a processor 1210. In some embodiments, processor 1210 may be any one or a combination of a digital signal processor (DSP), a microcontroller, a field-programmable gate array (FPGA) or any other processing system. The processor 1210 processes the digitized signal by performing image processing functions that include, but are not limited to:

Dewarping (barrel distortion correction): Images or video streams from wide-angle lenses, particularly fisheye lenses, are prone to barrel distortion. The dewarping function corrects for any barrel distortion in an image or video stream.

Contrast control: Each video stream may require some degree of contrast control, depending on the nature of the scene being imaged.

Brightness control: An image or video stream may need to be darkened or brightened appropriately for display.

Sharpening: Sharpening functions aim to improve the perceived sharpness and visual acuity of an image or video.

Downsampling: If the resolution of a video signal is greater than the resolution of the intended display, then the video signal will need to be downsampled to the appropriate display size.

Any other image processing functions.

In some embodiments, the processor 1210 may support a video frame rate of 30 frames per second. In other embodiments, processor 1210 may support a range of video frame rates such as a range of 10 frames per second to 28,000 frames per second. In some embodiments, the video stream may have a resolution of 640 pixels by 480 pixels. In other embodiments, higher video resolutions such as 720 progressive scan lines (720p) may be supported by the system. The output of the processor 1210 is transmitted to an overlay on display module 1214. The overlay on display module 1214 performs the function of combining the video stream output by processor 1210 with output from a computer-generated content module 1212, which includes information such as navigation data or other data such as caller ID. The overlay on display module 1214 outputs the combined signal to a coupling optics module 1216, which converts the electrical signal into an optical signal, and outputs this optical signal to a waveguide systems module 1218. The waveguide systems module 1218 guides, or transmits, the optical signal to a coupling out optics module 1220, which projects the optical signal onto visor 1222, where visor 1222 is the visor of helmet 102. In alternate embodiments, the optical signal is projected onto any type of surface or displayed by any type of display device, including but not limited to an optical surface or an optical combiner.

In some embodiments, the output of overlay on display module 1214 is transmitted to a video capture module 1215. Video capture module 1215 performs the function of reading the video stream from the overlay on display module 1214 and transmitting the video stream to a video codec 1217. In some embodiments, video codec 1217 is configured to process the video stream, including performing functions such as video compression on the video stream, where video compression methods may include standards that include but are not limited to H.264 compression. In some embodiments, video codec 1217 may include a circular buffer. The functions of the circular buffer may include implementing buffering algorithms for recording video. For example, the circular buffer may be configured to buffer video 5 minutes before an event trigger. In other embodiments, the video codec 1217 converts the video stream (which is a raw video stream) into one or more video file formats, including but not limited to .avi, .mpeg and so on (the file formats may also be referred to as "containers"). The output of the video codec 1217 is transmitted to a local storage module 1219 which may store any combination of uncompressed and compressed video on any combination of storage devices that include but are not limited to hard disk drives, flash drives and so on.

In some embodiments, the video stream output by processor 1210 is transmitted to a wireless interface module 1226, which is configured to wirelessly transmit the video stream to, for example, a remote server such as a server associated with a cloud computing system, herein referred to as cloud 1228. The wireless transmission of the video stream from wireless interface module 1226 to cloud 1228 may be achieved via methods including but not limited to wireless Internet connectivity, 3G, 4G/LTE, or any other similar wireless communication method. The video stream wirelessly transmitted by wireless interface module 1226 to cloud 1228 may be stored on a storage device such as a hard disk drive, for future access and sharing on social media sites, for example. Such methods allow a motorcycle rider to share their ride experiences from their point-of-view. In some embodiments, the stored video may be used for law enforcement or insurance matters that include, but are not limited to, accident liability. In other embodiments, a group of motorcycle riders may be wirelessly networked, and the wireless network may be enabled such that the group of riders can share their individual video streams with one another.

Figure 13:
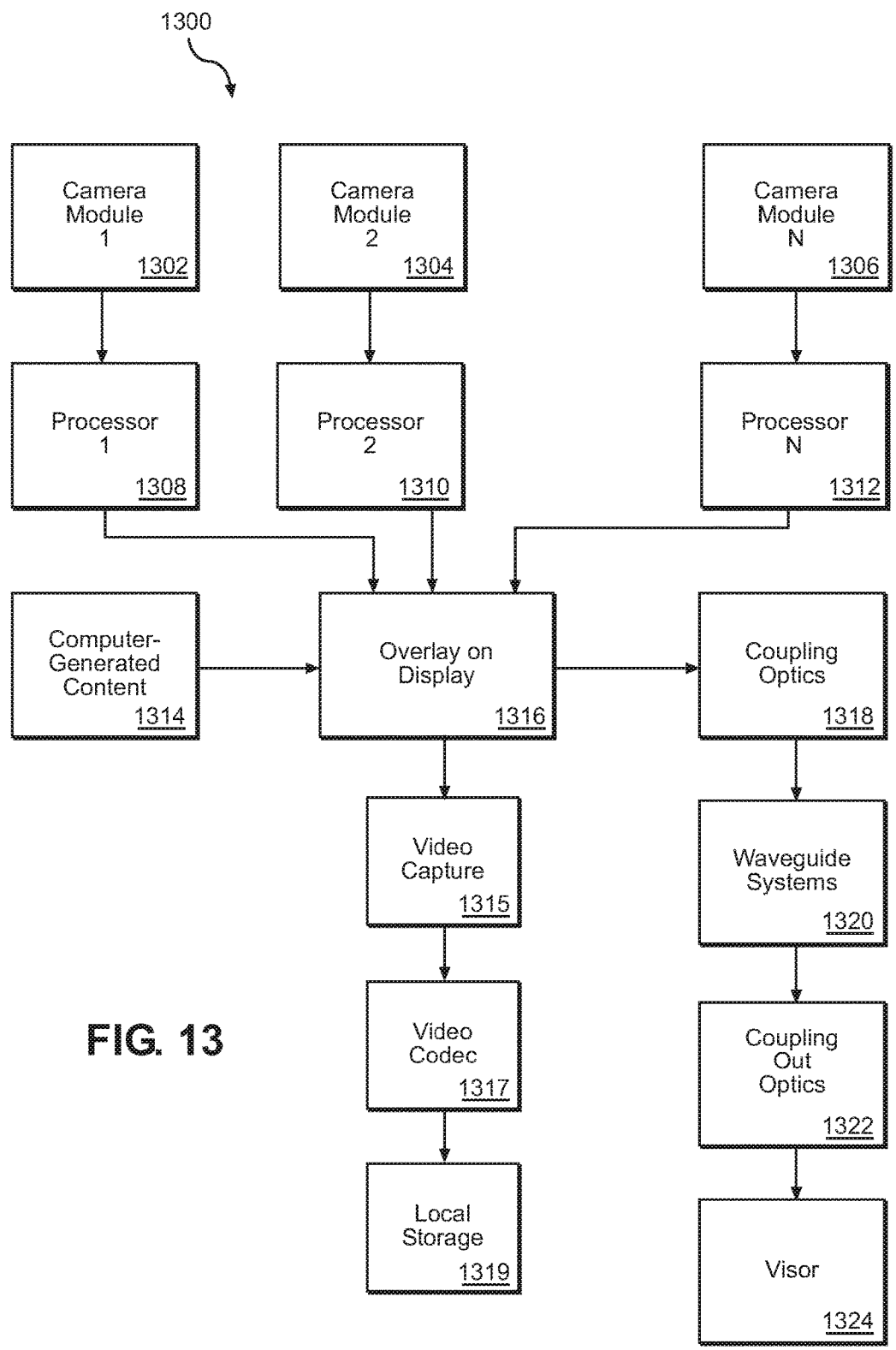
FIG. 13 is a block diagram depicting an embodiment of a system configured to project one or more video streams captured by multiple camera modules onto the visor of a helmet.

FIG. 13 is a block diagram depicting an embodiment of a system 1300 configured to project one or more video streams captured by multiple camera modules onto the visor of a helmet. In some embodiments, system 1300 includes a camera module 1302, a camera module 1304, and a camera module 1306, where camera modules 1302, 1304, and 1306 may each have a structure similar to camera module 1202. Camera modules 1302, 1304, and 1306 respectively output independent digitized video streams to a processor 1308, a processor 1310, and a processor 1312. In some embodiments, processors 1308, 1310, and 1312 may be any combination of a digital signal processors (DSPs), microcontrollers, field-programmable gate array (FPGAs) or any other processing system. In other embodiments, processors 1308, 1310, and 1312 may be replaced by a single processor with sufficient computing capacity to perform the various functions discussed herein.

Processors 1308, 1310, and 1312 each processes its individual digitized video stream. The processing of a digitized video stream includes image processing functions that include, but are not limited to:

Dewarping (barrel distortion correction): Images or video streams from wide-angle lenses, particularly fisheye lenses, are prone to barrel distortion. The dewarping function corrects for any barrel distortion in an image or video stream.

Contrast control: Each video stream may require some degree of contrast control, depending on the nature of the scene being imaged.

Brightness control: An image or video stream may need to be darkened or brightened appropriately for display.

Sharpening: Sharpening functions aim to improve the perceived sharpness and visual acuity of an image or video.

Downsampling: If the resolution of a video signal is greater than the resolution of the intended display, then the video signal will need to be downsampled to the appropriate display size.

Any other image processing functions.

In some embodiments, processors 1308, 1310, and 1312 may support a video frame rate of 30 frames per second. In other embodiments, processors 1308, 1310, and 1312 may support a range of video frame rates such as a range of 10 frames per second to 28,000 frames per second. In some embodiments, the video stream may have a resolution of 640 pixels by 480 pixels. In other embodiments, higher video resolutions such as 720 progressive scan lines (720p) may be supported by the system. In some embodiments, a single processor may be used in the place of multiple processors to perform the abovementioned functions.

The outputs of processors 1308, 1310, and 1312 are transmitted to the overlay on display module 1316. The overlay on display module 1316 performs the function of stitching together the outputs of processors 1308, 1310, and 1312 to generate a composite video stream (also referred to as "blended video"), and then combines the composite video stream with output from a computer-generated content module 1314 which includes information such as navigation data or other data such as caller ID. The overlay on display module 1316 outputs the combined signal to a coupling optics module 1318 which converts the electrical signal into an optical signal, and outputs this optical signal to a waveguide systems module 1320. The waveguide systems module 1320 guides, or transmits, the optical signal to a coupling out optics module 1322, which projects the optical signal onto a visor 1324 of helmet 102. In alternate embodiments, the optical signal is projected onto any type of surface or displayed by any type of display device, including but not limited to an optical surface or an optical combiner.

In some embodiments, the output of overlay on display module 1314 is transmitted to a video capture module 1315. Video capture module 1315 performs the function of reading the video stream from the overlay on display module 1314 and transmitting the video stream to a video codec 1317. In some embodiments, video codec 1317 is configured perform functions similar to those described for video codec 1217 as in FIG. 12. The output of the video codec 1317 is transmitted to a local storage module 1319 which may store any combination of uncompressed and compressed video on any combination of storage devices that include but are not limited to hard disk drives, flash drives and so on.

Figure 14:
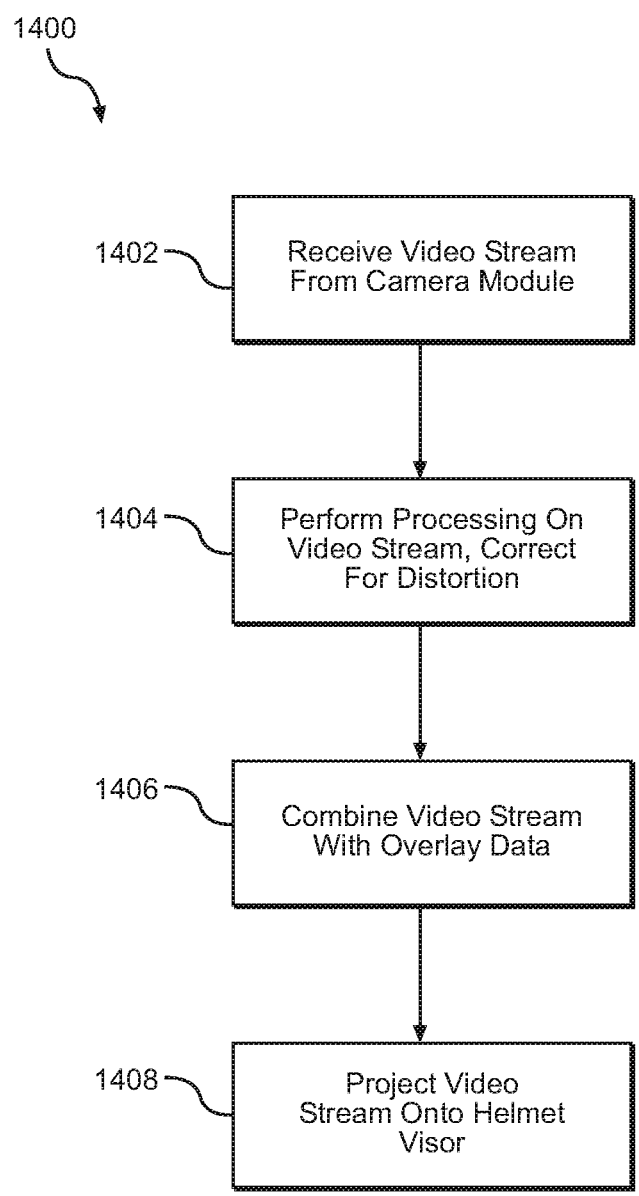
FIG. 14 is a flow diagram depicting an embodiment of a method to project a video stream captured by a single camera module onto the visor of a helmet.

FIG. 14 is a flow diagram depicting an embodiment of a method 1400 to project a video stream captured by a single camera module onto the visor of a helmet. At 1402, the method 1400 receives a video stream from a camera module. At 1404, the method performs processing on the video stream, where the processing functions may include image processing algorithms that include, but are not limited to, distortion correction. Next, at 1406, the method combines the video stream with overlay data, where the overlay data may include, but is not limited to, navigation information, caller ID, and so on. Finally, at 1408, the method projects the video stream onto a visor of a helmet for viewing by a user or wearer of the helmet.

Figure 15:
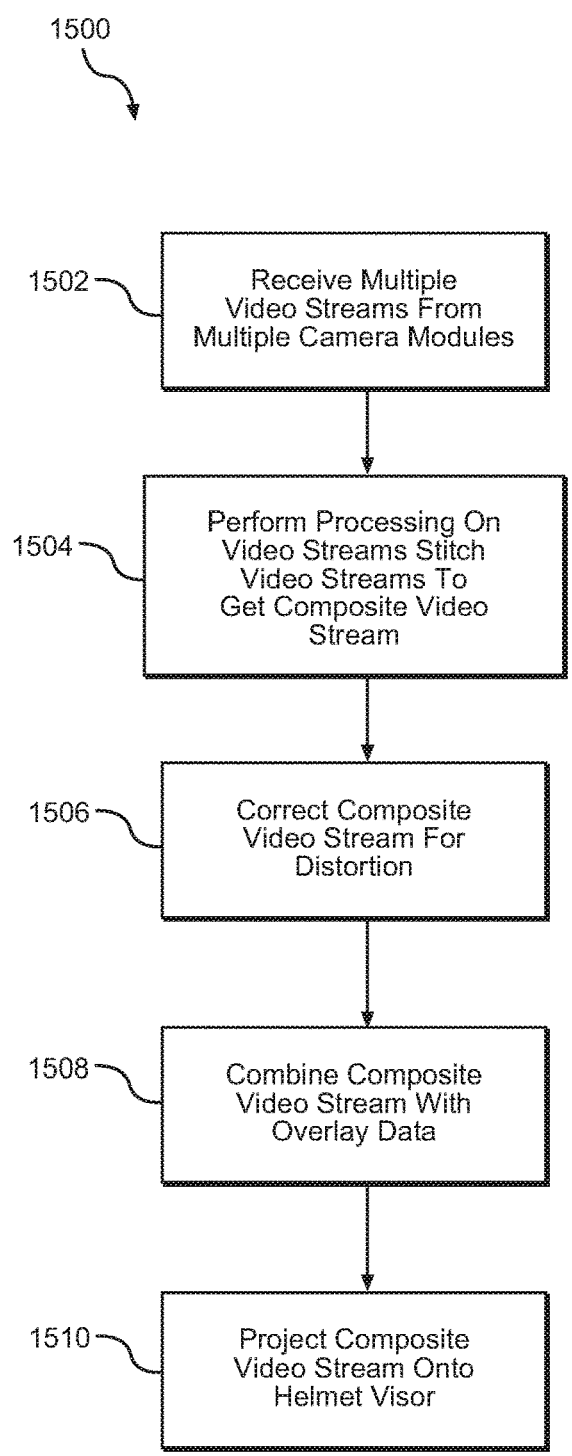
FIG. 15 is a flow diagram depicting an embodiment of a method to project video streams captured by multiple camera modules onto the visor of a helmet.

FIG. 15 is a flow diagram depicting an embodiment of a method 1500 to project video streams captured by multiple camera modules onto the visor of a helmet. At 1502, the method 1500 receives multiple video streams from multiple camera modules. At 1504, the method performs processing on the multiple video streams, where the processing functions may include image processing algorithms that include, but are not limited to, stitching the multiple video streams to get a composite video stream. At 1506, the method corrects the composite video stream for distortion. Next, at 1508, the method combines the composite video stream with overlay data, where the overlay data may include, but is not limited to, navigation information, caller ID and so on. Finally, at 1510, the method projects the composite video stream onto a visor of a helmet for viewing by a user or wearer of the helmet.

Figure 16:
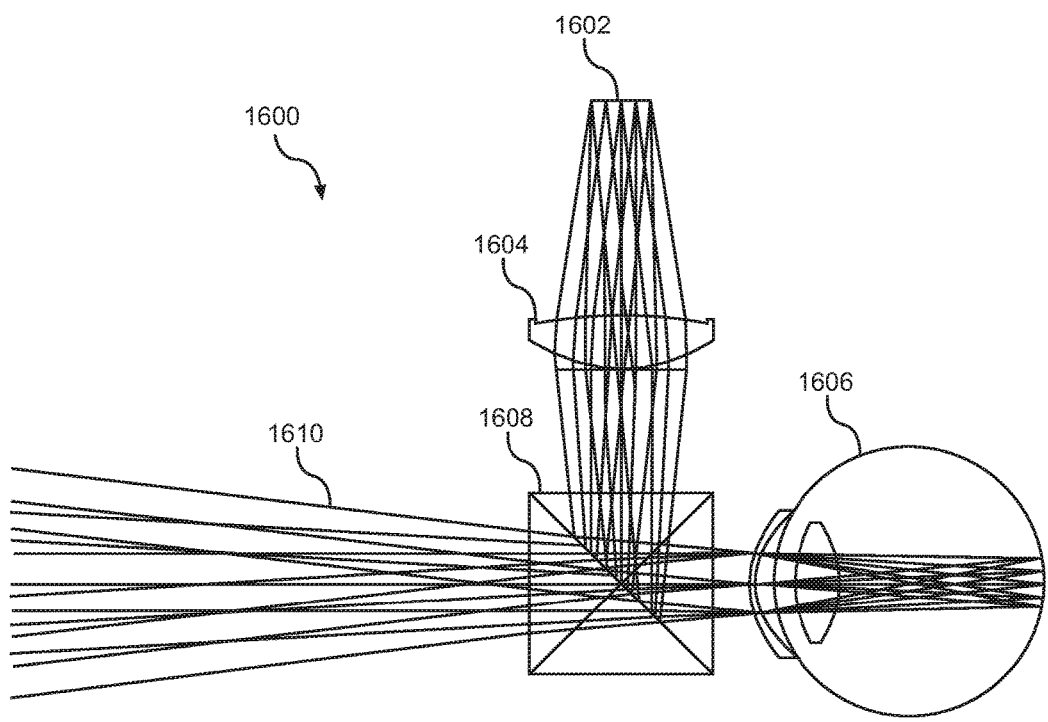
FIG. 16 is an optical diagram depicting an embodiment of a system that projects optical data or video onto a transparent surface in an observer's field-of-view.

FIG. 16 is an optical diagram depicting an embodiment of a system 1600 that projects optical data or video onto a transparent surface in an observer's field-of-view. In some embodiments, the transparent surface is the visor of helmet 102. FIG. 16 depicts an eye 1606 of a user, and light rays 1610 from a distant object that project an image within the eye 1606 of the user. Light rays from overlay data 1602 pass through optical system 1604, and impinge on combiner optics assembly 1608. In some embodiments, the combiner optics assembly 1608 may be comprised of one or any combination of a polarized cube beam splitter, a non-polarized cube beam splitter, a beam splitter plate, or a curved semi-reflective surface comprised of glass, plastic, polycarbonate or any other transmissive material. Combiner optics assembly 1608 allows light rays 1610 from a distant object to pass through it, while light rays from overlay data 1602 are reflected to form an image of the overlay data 1602 within the eye 1606 of the user. In some embodiments, the visor of helmet 102 functions as the combiner optics assembly 1608. As seen in the figure, using the combiner optics assembly 1608, the image from the distant object via light rays 1610 and the overlay data 1602 are simultaneously projected within the eye 1606 of the user. In some embodiments, the overlay data 1602 may be navigation data or other data such as caller ID.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A helmet comprising:
a first image sensor configured to generate a first video signal located along a first optical axis;
a second image sensor configured to generate a second video signal located along a second optical axis that is substantially parallel to the first optical axis, wherein the second image sensor includes an image sensing surface and is disposed such that the image sensing surface is oriented in a direction that is opposite to the orientation of an image sensing surface of the first image sensor;
a first lens assembly optically coupled to the first image sensor, wherein the first lens assembly projects a 180-degree field-of-view onto the first image sensor;
a second lens assembly optically coupled to the second image sensor, wherein the second lens assembly projects a 180-degree field-of-view onto the second image sensor;
one or more processors configured to independently process the video signal generated by the first image sensor and the video signal generated by the second image sensor, wherein the first video signal includes the 180-degree field-of-view projected by the first lens assembly on the first image sensor, wherein the second video signal includes the 180-degree field-of-view projected by the second lens assembly on the second image sensor, wherein the one or more processors independently correct for any distortion present in the first video signal to generate a first corrected video signal, and wherein the one or more processors independently correct for any distortion present in the second video signal to generate a second corrected video signal; and
a projection system that projects the first corrected video signal and the second corrected video signal onto a visor of the helmet for viewing by a user, wherein the first corrected video signal offers a 180-degree field-of-view, and the second corrected video signal offers a 180-degree field-of-view to the user.

2. The helmet of claim 1, wherein the combination of the first corrected video signal and the second corrected video signal presents a 360-degree field-of-view to the user.

3. The helmet of claim 1, wherein the user can select either the first corrected video signal or the second corrected video signal for viewing.

* * * * *